United States Patent
Kathiresan et al.

(10) Patent No.: US 11,526,777 B2
(45) Date of Patent: Dec. 13, 2022

(54) INTERACTIVE DESIGN AND SUPPORT OF A REFERENCE ARCHITECTURE

(71) Applicant: Accenture Global Solutions Limited, Dublin (IE)

(72) Inventors: Sakthikumar Kathiresan, Bangalore (IN); Bibin George Thottikkara, Bangalore (IN); Mukunda Ram Bhuyan, Bangalore (IN); Sudipta Mukhopadhyaya, Bangalore (IN); Srinivasan Sarangarajan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 1044 days.

(21) Appl. No.: 16/209,210

(22) Filed: Dec. 4, 2018

(65) Prior Publication Data

US 2020/0175395 A1    Jun. 4, 2020

(51) Int. Cl.
*G06N 5/04* (2006.01)
*G06N 20/00* (2019.01)
(Continued)

(52) U.S. Cl.
CPC ............ *G06N 5/04* (2013.01); *G06F 9/44505* (2013.01); *G06F 16/9038* (2019.01);
(Continued)

(58) Field of Classification Search
CPC ...... G06N 5/04; G06N 20/00; G06F 9/44505; G06F 16/90332; G06F 16/9038;
(Continued)

(56) References Cited

U.S. PATENT DOCUMENTS

2012/0198103 A1* 8/2012 Hodges ............... G06F 13/4095
710/33
2014/0129703 A1* 5/2014 Patel .................. H04L 43/0876
709/224
(Continued)

FOREIGN PATENT DOCUMENTS

CN           105608254 B      8/2018

*Primary Examiner* — Kieu D Vu
*Assistant Examiner* — Rami R Okasha
(74) *Attorney, Agent, or Firm* — Harrity & Harrity, LLP

(57) ABSTRACT

A device receives priority data identifying priorities relevant to a configuration of an application and receives feature data identifying features related to the priorities. The device identifies technology services based on a machine learning-driven analysis of the priorities and features, and includes data identifying the technology services as part of the reference architecture. The device provides data identifying the reference architecture for display via an interface, and receives data identifying technology services that have been selected by a user. The device updates scores associated with the reference architecture based on the selected technology services. A subset of the scores may be updated to reflect one or more degrees to which one or more cloud service providers offer the selected technology services. The device provides data identifying the updated scores for display via the interface to allow the scores to be used to select a particular cloud service provider.

20 Claims, 12 Drawing Sheets

(51) Int. Cl.
*G06F 16/9038* (2019.01)
*G06T 19/00* (2011.01)
*G06F 9/445* (2018.01)
*G06F 16/9032* (2019.01)
*G06F 40/20* (2020.01)

(52) U.S. Cl.
CPC ........ *G06F 16/90332* (2019.01); *G06F 40/20* (2020.01); *G06N 20/00* (2019.01); *G06T 19/006* (2013.01)

(58) Field of Classification Search
CPC ... G06F 40/20; G06F 8/20; G06F 8/36; G06T 19/006
See application file for complete search history.

(56) References Cited

U.S. PATENT DOCUMENTS

| | | | |
|---|---|---|---|
| 2014/0279201 A1 | 9/2014 | Iyoob et al. | |
| 2015/0268935 A1 | 9/2015 | Muntes et al. | |
| 2016/0321034 A1* | 11/2016 | Yen | G06F 8/20 |
| 2017/0017655 A1* | 1/2017 | Pinto | G06F 16/248 |
| 2017/0235662 A1* | 8/2017 | Leask | G06F 11/302 |
| | | | 717/125 |
| 2018/0232463 A1* | 8/2018 | Chakraborty | G06F 16/907 |
| 2019/0303110 A1* | 10/2019 | Brude | G06F 3/0484 |
| 2019/0306236 A1* | 10/2019 | Wiener | H04L 41/0816 |
| 2020/0053175 A1* | 2/2020 | Bodman | H04L 67/22 |

* cited by examiner

INTERACTIVE DESIGN AND SUPPORT OF A REFERENCE ARCHITECTURE

BACKGROUND

In the field of computer architecture, a reference architecture may provide a template solution for an architecture for a particular domain. For example, a software reference architecture may include structures and respective elements and relations that serve as a template for a software architecture.

SUMMARY

According to some implementations, a method may comprise receiving priority data identifying one or more priorities that may be relevant to a configuration of a software application and receiving feature data identifying one or more features related to the one or more priorities. The method may comprise identifying a set of technology services to include in a reference architecture that is to be used to select at least one cloud service provider to support the software application. The set of technology services may be identified based on a machine learning-driven analysis of the one or more priorities and the one or more features. The method may comprise including data that identifies the set of technology services as part of the reference architecture and providing data identifying the reference architecture for display via an interface. The method may comprise receiving data identifying one or more selected technology services of the set of technology services. The data identifying the one or more selected technology services may serve as an indicator that the one or more selected technology services have been selected by a user. The method may comprise updating a set of scores associated with the reference architecture based on the one or more selected technology services. A subset of the set of scores may be updated to reflect one or more degrees to which one or more cloud service providers offer the one or more selected technology services. The method may comprise providing data identifying the set of scores that have been updated for display via the interface to allow the set of scores to be used to select a particular cloud service provider.

According to some implementations, a device may include one or more memories, and one or more processors, operatively coupled to the one or more memories, to receive, from a user device, priority data identifying one or more priorities that may be relevant to a configuration of one or more applications, and to receive, from the user device, feature data identifying one or more features related to the one or more priorities. The one or more processors may identify a set of technology services to include in a reference architecture that is to be used to select at least one cloud service provider to support the one or more applications. The set of technology services may be identified based on the one or more priorities and the one or more features. The one or more processors may include data that identifies the set of technology services as part of the reference architecture and may provide data identifying the reference architecture to be displayed via an interface of the user device. The one or more processors may receive data identifying one or more selected technology services, of the set of technology services. The one or more processors may update a set of scores associated with the reference architecture based on a result of a machine learning-driven analysis of the one or more priorities, the one or more features, and the one or more selected technology services. The set of scores may include at least one of: a first subset of the set of scores indicating one or more degrees to which one or more cloud service providers offer the one or more selected technology services, a second subset of the set of scores indicating one or more degrees to which the one or more selected technology services relate to the one or more features, or a third subset of the set of scores indicating one or more degrees to which the one or more selected technology services have satisfied a set of architecture requirements. The one or more processors may provide data identifying the set of scores that have been updated to be displayed via the interface of the user device.

According to some implementations, a non-transitory computer-readable medium may include one or more instructions that, when executed by one or more processors of a device, cause the one or more processors to receive, from a user device, priority data identifying one or more priorities that may be relevant to a configuration of an application, and to receive, from the user device, feature data identifying one or more features related to the one or more priorities. The one or more instructions may cause the one or more processors to identify a set of technology services to include in a reference architecture that is to be used to select at least one cloud service provider to support the application. The set of technology services may be identified based on the one or more priorities and the one or more features. The one or more instructions may cause the one or more processors to include data that identifies the set of technology services as part of the reference architecture and to provide data identifying the reference architecture to be displayed via an interface of the user device. The one or more instructions may cause the one or more processors to provide configuration instructions to another device to allow the other device to use the configuration instructions to provide an interactive display of the set of technology services in a manner that is accessible by a user. The one or more instructions may cause the one or more processors to receive, from the other device, data identifying one or more selected technology services, of the set of technology services, that have been selected via the interactive display of the set of technology services. The one or more instructions may cause the one or more processors to update a set of scores associated with the reference architecture based on the one or more selected technology services. A subset of the set of scores may be updated to reflect one or more degrees to which one or more cloud service providers offer the one or more selected technology services. The one or more instructions may cause the one or more processors to provide data identifying the set of scores that have been updated to be displayed via the interface of the user device, to allow the set of scores to be used to select a particular cloud service provider.

DETAILED DESCRIPTION

Figure 1A:
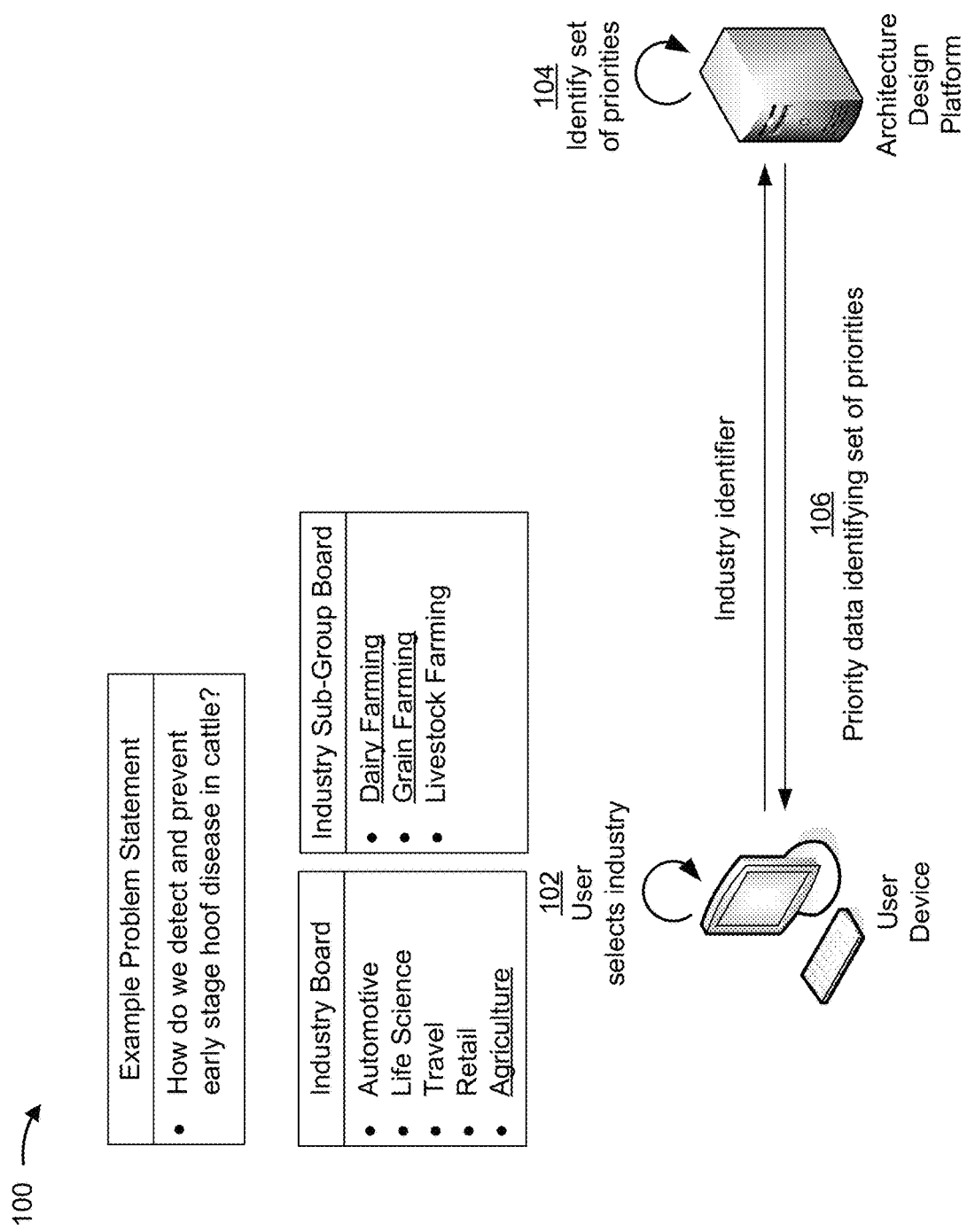
FIGS. 1A-1G are diagrams of an example implementation described herein.

The following detailed description of example implementations refers to the accompanying drawings. The same reference numbers in different drawings may identify the same or similar elements.

A group of individuals who are part of an organization may collaborate to create a software-based solution (referred to hereafter as the solution) that addresses a need of the organization. The group of individuals may discuss high-level details relating to a software architecture that could be used to support the solution. For example, the group of individuals may consider which technology services should be used in the software architecture (e.g., a machine learning service, an edge computing service, an analytics service, a security service, a user interface service, and/or the like), may select a cloud service provider that is to support the solution, and/or the like.

However, the group of individuals may be unable to effectively make architectural recommendations regarding the solution. For example, cloud service providers may offer different combinations of out-of-box packages of technology services. To select a best-fit cloud service provider, the group of individuals may need to first select technology services, and may then need to select a best-fit cloud service provider based on a number of out-of-box solutions offered by prospective cloud service providers, based on prices offered by the prospective cloud service providers, and/or the like. This may be difficult when the group of individuals are frequently changing the group of technology services to be used for the solution, when cloud service providers are frequently changing price packages offered to customers, and/or the like.

Some implementations described herein include an architecture design platform that provides an interactive, machine learning-driven solution for designing and updating a reference architecture. For example, a user may interact with an interface of a reference architecture design tool to select one or more priorities and one or more features that are to be used to generate a reference architecture for an application (priorities and features are discussed in more detail below). In this case, the architecture design platform may use machine learning to analyze the one or more priorities and the one or more features to identify a set of technology services that may be included in the reference architecture. The set of technology services may identify broad technical services and/or concepts that may be relevant to the application (e.g., a machine learning service, a monitoring service, an analytics service, and/or the like).

Additionally, the architecture design platform may include the set of technology services in the reference architecture and may provide data identifying the reference architecture for display via an interface of the reference architecture design tool. This may allow the user to interact with the interface to select one or more technology services. When the user selects the one or more technology services (referred to herein as the one or more selected technology services), the architecture design platform may update a set of scores included in the reference architecture. For example, the architecture design platform may update a first score that indicates one or more degrees to which the one or more selected technology services relate to the one or more priorities and/or the one or more features, a second score that indicates one or more degrees to which a particular cloud service provider offers the one or more selected technology services, a third score that indicates one or more degrees to which the one or more selected technology services have satisfied a set of architecture requirements, and/or the like. Furthermore, the architecture design platform may provide data identifying the set of scores for display via the interface of the reference architecture design tool, which may allow the user to view an impact that the one or more selected technology services may have on the overall reference architecture, on selection of a best-fit cloud service provider, and/or the like.

In this way, the architecture design platform provides the user with a reference architecture that assists the user with selecting technology services, with selecting a cloud service provider, and/or the like. Additionally, when a user-driven action occurs that changes the reference architecture (e.g., the user may add a technology service to and/or may remove a technology service from the one or more selected technology services), the architecture design platform may dynamically update one or more scores to reflect an impact that the change may have on developing a solution associated with the one or more priorities and/or the one or more features that have been selected, may update a score to reflect an impact that the change may have on selecting a cloud service provider, and/or the like. By understanding an impact that a change has on selection of a cloud service provider, the user is able to select a best-fit cloud service provider. This conserves resources (e.g., processing resources, network resources, memory resources, and/or the like) that would be wasted generating aspects of the application that are offered by the best-fit cloud service provider but not offered by the selected cloud service provider.

Furthermore, several different stages of the process for designing and updating the reference architecture are automated, which removes human subjectivity and waste from the process, and which may improve speed and efficiency of the process and conserve computing resources (e.g., processor resources, memory resources, and/or the like). For example, the architecture design platform may automatically update scores to reflect a change that the user has made to the reference architecture. This eliminates a need for the user to manually update the scores and allows the user to view how the change impacts priorities and features that are being considered, a recommendation of a cloud service provider, and/or the like, thereby improving quality and efficiency of the process. Additionally, implementations described herein use a rigorous, computerized process to perform tasks or roles that were not previously performed or were previously performed using subjective human intuition or input.

FIGS. 1A-1G are diagrams of an example implementation 100 described herein. Example implementation 100 may include a user device, an architecture design platform, and a smart board. As shown in FIGS. 1A-1G, the architecture design platform may provide a reference architecture for display during, for example, a brainstorming session associated with a configuration of an application and/or may update the reference architecture throughout the brainstorming session.

The term "brainstorming session," as used herein, may refer to a group of individuals (e.g., employees and/or contractors of an organization) that have been given a problem to solve and that are to collaborate to identify a software-based solution (e.g., referred to herein as the application) to the problem. The brainstorming session may occur in one location, in multiple locations, at a particular time period, at separate time periods (e.g., via separate meetings), and/or the like. Implementations associated with the brainstorming session are provided by way of example. In practice, one or more implementations described herein may be applied independent of a brainstorming session.

In some implementations, a reference architecture development tool may be accessible to the group of individuals involved in the brainstorming session. The reference architecture development tool may support functionality used to create a reference architecture. The reference architecture development tool may be a program hosted on a user device or the architecture design platform, a website hosted on or supported by the architecture design platform, and/or the like. An individual that interacts with the architecture management tool may be referred to herein as user.

As shown in FIG. 1A, and by reference number 102, a user may interact with an interface of the reference architecture development tool (e.g., an application interface, a web interface, etc.) to select an industry that relates to the problem that is to be discussed during the brainstorming session. For example, the user may launch the reference architecture development tool and may select a menu option to create a reference architecture. This may prompt the user to select an industry (e.g., an industry associated with the organization, an industry relating to the problem that has been presented to the group of individuals, etc.). The industry may be, for example, an automotive industry, a life science industry, a travel industry, a retail industry, an agriculture industry, an electronics and technology industry, a media and entertainment industry, and/or the like. When the user selects the industry, an industry identifier may be provided to the architecture design platform for further processing.

In some implementations, the user may select one or more industry sub-groups. For example, if the user selects agriculture as the industry, the user may be prompted to select one or more industry sub-groups, such as dairy farming, grain farming, livestock farming, and/or the like.

While implementations described herein refer to a hierarchy of terms (e.g., an industry may include industry sub-groups, the industry sub-groups may relate to particular priorities, and the particular priorities may relate to particular features), it is to be understood that any hierarchies described herein are provided by way of example. In practice, any number of different hierarchies may be employed. For example, while agriculture is described as an industry, in another hierarchy, a variant of agriculture might be used as an industry sub-group. To provide an example, if consumer goods and services is used as an industry, agricultural goods and services may be used as an industry sub-group.

In some implementations, the architecture design platform may receive or have access to additional information that may be further processed. For example, the architecture design platform may receive data describing the problem that is to be solved, may receive or have access to user profile data of the user (e.g., which may include location information for the user, a job title of the user, preferences of the user, etc.), and/or the like.

As an example, the user may describe the problem that is to be solved by interacting with a free-form text box that is part of the interface of the reference architecture design tool, by selecting a type of problem from a menu of selectable problem types, and/or the like. In the example shown, the user may input a description of the problem which may indicate that the problem relates to detecting and preventing early stage hoof disease in cattle. This may cause the data describing the problem (along with the industry identifier) to be provided to the architecture design platform. As another example, the brainstorming session may include an oral discussion regarding the problem and an audio file recording of the oral discussion may be provided to the architecture design platform.

As shown by reference number 104, the architecture design platform may identify a set of priorities to recommend to the user. For example, the architecture design platform may use the industry identifier, the data describing the problem, the user profile data, and/or the like, to identify a set of priorities to recommend to the user.

The set of priorities may include a priority directed to a specific industry, a priority directed to an organizational process, a priority directed to an organizational concept, and/or the like. In the example shown, because the problem relates to detection and prevention of early stage hoof disease in cattle, the user may select agriculture as the industry, and dairy farming and grain farming as industry-specific groups. In this example, the set of priorities available to the user may include a priority directed to farming strategy, a priority directed to feed sourcing, a priority directed to herd operations, a priority directed to dairy operations, a priority directed to plant monitoring, and a priority directed to soil monitoring. As another example, if the user selects communication, media, and technology as the industry, the set of priorities may include a priority directed to asset tracking, a priority directed to optimization of logistics, a priority directed to asset condition monitoring, a priority directed to production monitoring, a priority directed to optimization of production, a priority directed to worker safety, a priority directed to worker efficiency, a priority directed to equipment efficiency, a priority directed to plant visibility, a priority directed to factory facility management, a priority directed to optimization of a fleet of vehicles, and/or the like.

In some implementations, priority data that identifies the set of priorities may be stored using a data structure that is accessible to the architecture design platform. For example, when an organization purchases the reference architecture development tool, the organization may be asked to provide data identifying a list of organizational processes, organizational concepts, and/or the like, that may be stored as priority data. Additionally, or alternatively, as users (e.g., employees of the organization) utilize the reference architecture development tool, the users may input priorities. These priorities may be stored using the data structure and may be available to recommend to subsequent users.

In some implementations, the architecture design platform may identify a set of priorities to recommend to the user by referencing the data structure. For example, the architecture design platform may use the industry identifier to search the data structure for data identifying a set of priorities that may be stored in association with a corresponding industry identifier.

Additionally, or alternatively, the architecture design platform may use a natural language processing technique and/or a term matching technique to identify a set of priorities. For example, if the architecture design platform receives data describing the problem, the architecture design platform may use a term frequency-inverse document frequency (TF-IDF) technique, a term matching technique, and/or the like, to analyze the data to determine a problem type, an industry relating to the problem, and/or the like. As a specific example, the architecture design platform may use the TF-IDF technique to determine that the description of the problem includes words that are commonly found in the farming industry. This may allow the architecture design platform to reference the data structure to identify priorities that are stored in association with the farming industry.

Additionally, or alternatively, the architecture design platform may use a machine learning technique to identify a set of priorities. For example, the architecture design platform may have trained a data model (or may have received a trained data model) that is able to use a machine learning technique to analyze historical data to predict the set of priorities. The historical data may include historical data that identifies problems solved by past users, historical profile information of the past users, historical industry information indicating industries selected by past users, and/or the like. The data model may have been trained using indicator values that identify trends, correlations, relationships, and/or the like, between the historical data and particular priority data. As a specific example, the data model may be trained to identify a trend that users within a particular department of the organization are likely to select from a certain subset of priorities.

To identify the set of priorities, the architecture design platform may provide the industry identifier, the data describing the problem, and/or the user profile data for the user as input to the data model to cause the data model to output a set of priority scores. The set of priority scores may identify a likelihood of particular priorities relating to the industry, to the problem, and/or to the user. Additionally, the architecture design platform may determine that a subset of the set of priority scores satisfy a threshold confidence level, and may identify, as the set of priorities, priorities that are associated with the subset of the set of priority scores.

As shown by reference number 106, the architecture design platform may provide priority data identifying the set of priorities to the user device. For example, the architecture design platform may provide the data identifying the set of priorities for display on the interface of the reference architecture development tool.

In this way, the architecture design platform may identify and provide the user device with the set of priorities.

Figure 1B:
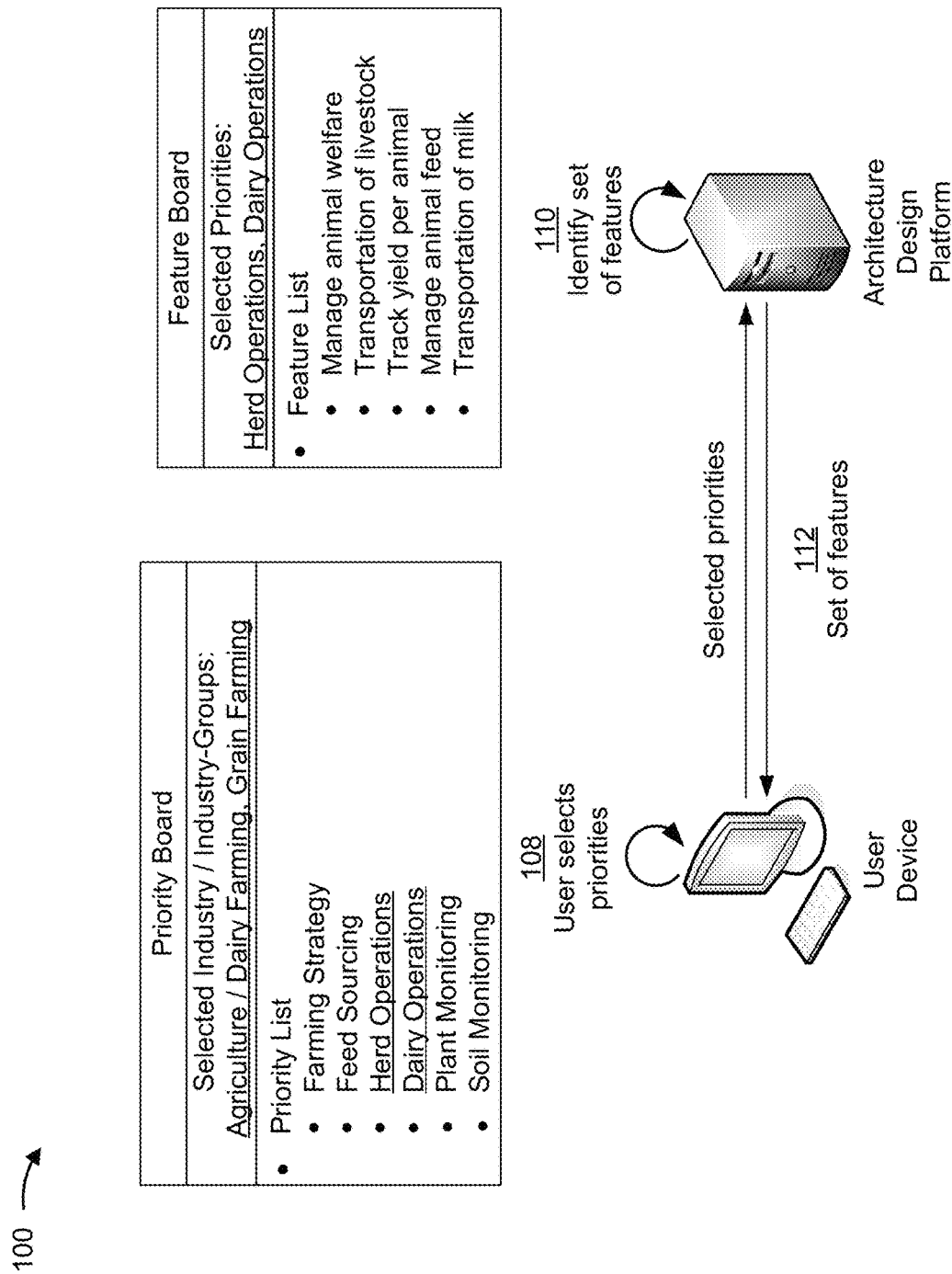

As shown in FIG. 1B, and by reference number 108, the user may select one or more priorities. For example, the user may interact with the interface of the reference architecture development tool to select one or more priorities that may be relevant when developing a solution to the problem. In the example shown (as shown by the underlined priorities), the user may select a priority directed to herd operations and a priority directed to dairy operations. This may cause data identifying the one or more priorities that have been selected to be provided to the architecture design platform.

As shown by reference number 110, the architecture design platform may identify a set of features. For example, the architecture design platform may use the data identifying the set of priorities, the industry identifier, the data describing the problem, the user profile data, and/or the like, to identify a set of features to recommend to the user.

The set of features may identify tasks, properties, and/or the like, that relate to the set of priorities. For example, the set of features may include a feature that identifies a task relating to an organizational process, a feature that identifies a property or a task of an organizational concept, and/or the like. In the example shown, the user selected herd operations and dairy operations as priorities. In this example, the set of features that are available may include a feature for a task used to manage animal welfare, a feature for a task involving transportation of livestock, a feature for a task involving tracking yield per animal, a feature involving a task for managing animal feed, and a feature involving a task relating to transportation of milk.

As another example, the user may select communication, media, and technology, as the industry, electronics and technology as an industry sub-group, and worker safety and worker efficiency as priorities. In this example, the set of features that are available may include a feature for a task involving managing worker safety, a feature identifying a specific property of worker safety and efficiency, and/or the like.

In some implementations, data identifying the set of features may be stored using the data structure. In some implementations, the architecture design platform may identify the set of features using one or more techniques described herein. For example, the architecture design platform may identify the set of features by referencing the data structure, by performing an analysis that utilizes the natural language processing technique, by performing an analysis that uses another data model (or the same data model described above if a singular model is used to make both priority-based predictions and feature-based predictions), and/or the like.

As an example, the architecture design platform may have trained a data model (or may have received a trained data model) that is able to use a machine learning technique to analyze historical data to predict the set of features. The historical data may include the types of historical data described above, historical priority data, and/or the like. The data model may have been trained using indicator values that identify trends, correlations, relationships, and/or the like, between the historical data and particular features.

To identify the set of features, the architecture design platform may provide the industry identifier, the data describing the problem, the user profile data for the user, and/or the data identifying the set of priorities as input to the data model to cause the data model to output a set of feature scores. The set of feature scores may identify a likelihood of particular features relating to the one or more priorities (and/or to one or more other input values). Additionally, the architecture design platform may determine that a subset of the set of feature scores satisfy a threshold confidence level, and may identify, as the set of features, features that are associated with the subset of the set of priority scores.

As shown by reference number 112, the architecture design platform may provide data identifying the set of features to the user device. For example, the architecture design platform may provide the data identifying the set of features for display on the interface of the reference architecture development tool.

In this way, the architecture design platform may identify and provide the user device with the set of features.

Figure 1C:
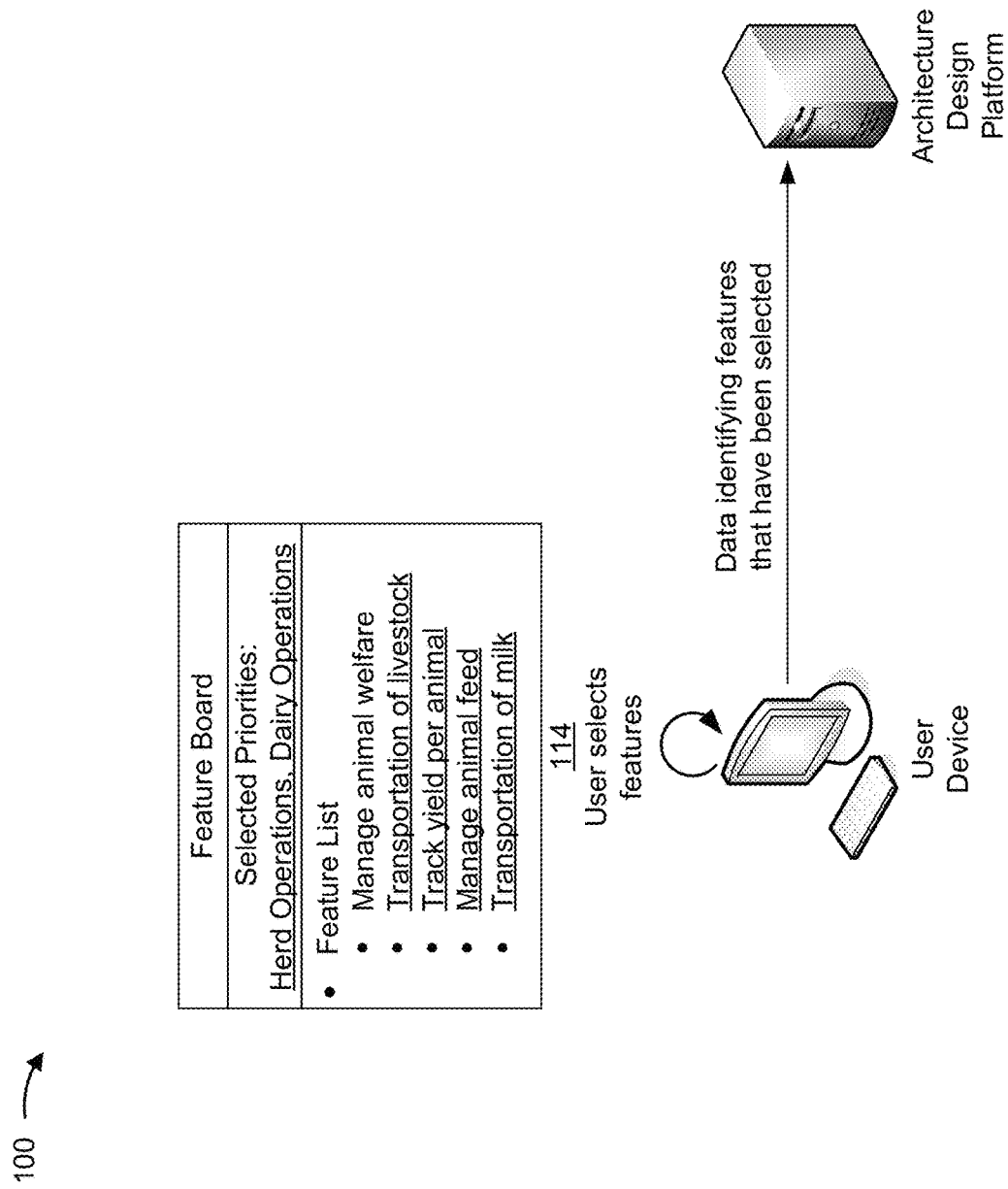

As shown in FIG. 1C, and by reference number 114, the user may select one or more features. For example, the user may interact with the interface of the reference architecture development tool to select one or more features that may be relevant when developing the application that is to serve as a solution to the problem. In the example shown (as indicated by the underlined features), the user may select the feature for the task involving transportation of livestock, the feature for the task involving tracking yield per animal, the feature involving the task for managing animal feed, and the feature involving the task relating to transportation of milk. This may cause data identifying the one or more features that have been selected to be provided to the architecture design platform.

In this way, the user device may provide the architecture design platform with the data identifying the one or more features that have been selected.

Figure 1D:
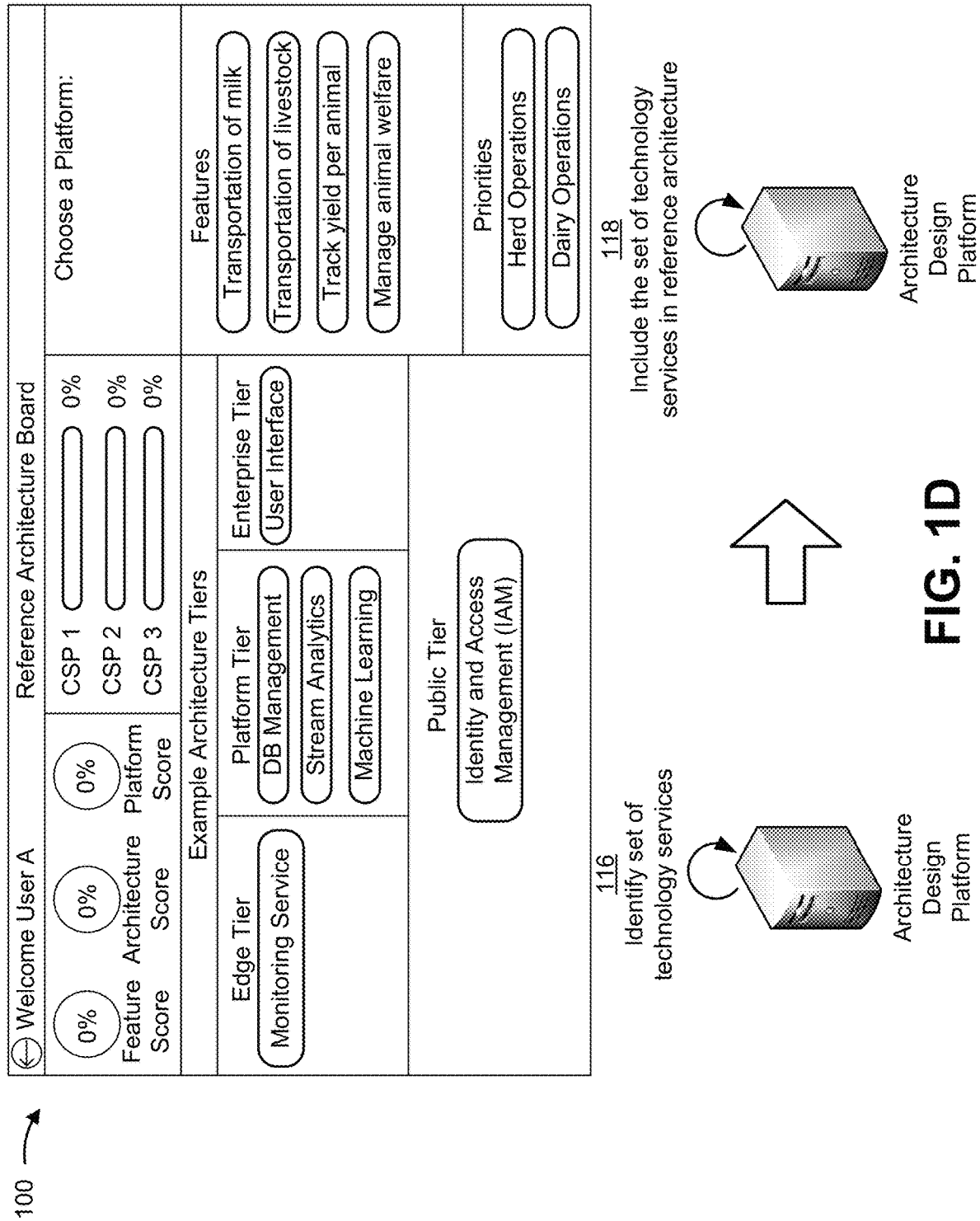

As shown in FIG. 1D, and by reference number 116, the architecture design platform may identify a set of technology services. For example, the architecture design platform may identify a set of technology services that are predicted to be relevant for the reference architecture. In this case, the architecture design platform may identify the set of technology services by using a machine learning technique to analyze the data identifying the set of priorities, the data identifying the set of features, and/or any other data may be useful in predicting technology services (e.g., the data describing the problem, the industry identifier, and/or the like).

The set of technology services may identify broad technical concepts that may be relevant to the reference architecture, relevant to the application that may be used as the solution to the problem, and/or the like. To provide a few examples, the set of technology services may include a database management service, an enterprise integration service, a user interface service, a machine learning service, a monitoring service, an analytics service, a security service, and/or the like.

In some implementations, the architecture design platform may use a machine learning technique to identify the set of technology services. For example, the architecture design platform may have trained a data model (or may have received a trained data model) that is able to use a machine learning technique to analyze historical data to predict the set of technology services. The historical data may include data identifying technology services that were selected by past users, historical priority data and historical feature data of features and priorities selected by the past users, data describing problems assigned to the past users, and/or the like. The data model may have been trained using indicator values that identify trends, correlations, relationships, and/or the like, between the priority and feature data in relation to the data identifying the technology services that were selected by the past users. As a specific example, the data model may have been trained to identify a trend that users who select features relating to transportation (e.g., transportation of livestock, transportation of milk, and/or the like) are likely to utilize a monitoring service (e.g., because improving a transportation process often requires monitoring information associated with the act of transporting goods and services).

To identify the set of technology services, the architecture design platform may provide the priority data and the feature data as input to the data model, to cause the data model to output a set of relevancy scores indicating a degree to which particular technology services are relevant to the reference architecture, to the one or more priorities and features, to solving the problem, and/or the like. Additionally, the architecture design platform may determine that a subset of the set of relevancy scores, which are associated with the set of technology services, satisfy a threshold confidence level. This may allow the architecture design platform to identify the set of technology services.

In some implementations, the architecture design platform may identify technology service details to recommend with a technology service. For example, the architecture design platform may use machine learning to identify technology service details to recommend with the technology service. In this case, the architecture design platform may include the details of the technology service in the reference architecture.

For example, rather than identify a database management service as being relevant for the reference architecture, the architecture design platform may use machine learning to identify a specific type of database that would be relevant for the reference architecture. As another example, rather than identify a stream analytics service as being relevant for the reference architecture, the architecture design platform may use machine learning to identify a specific type of stream analytics that would be relevant for the reference architecture.

As shown by reference number 118, the architecture design platform may include the set of technology services in the reference architecture. The "reference architecture," as used herein, may refer to a collection of fields, a collection of values, a collection of objects (e.g., images, etc.), and/or the like, that are to be used as part of a graphical display of elements being considered by users that are creating a software architecture.

The collection of fields may include a username field, scoring fields, fields identifying particular cloud service providers, a field for selecting a cloud service provider, fields identifying the one or more features that have been selected, fields identifying the one or more priorities that have been selected, fields representing a group of architecture tiers (shown in FIG. 1D as four boxes labeled as an edge tier, a platform tier, an enterprise tier, and a public tier), and/or the like. The architecture tiers may provide a logical way to segment technology services. For example, in the architecture tiers shown, the tiers may segment technology services based on a location of a device that is to host or support the technology services (e.g., a monitoring service may be hosted on a device located at an edge of a network and thus may be placed into the edge tier). The architecture tiers shown are provided by way of example. In practice, any number of architecture tiers, different types of architecture tiers, and/or the like, may be used within the reference architecture.

The collection of values may correspond to the collection of fields, and may include a username value (shown as User A), a set of scores (shown as a feature score of 0% (which in some cases, may also include a priority score), an architecture score of 0%, a platform score of 0%, and cloud service provider scores for three cloud service providers, shown as 0%, 0%, and 0%, respectively), cloud service provider identifier values (shown as CSP 1, CSP 2, and CSP 3), a cloud service provider selection value (which may appear in the blank space under the "choose a platform" text, values identifying the set of technology services, which may correspond to the fields representing the group of architecture tiers (shown as a monitoring service, a database (DB) management service, a stream analytics service, a machine learning service, a user interface service, and an identity and access management (IAM) service), values for the one or more features that have been selected (shown as transportation of milk, transportation of livestock, track yield per animal, and manage animal welfare), values for the one or more priorities that have been selected (shown as herd operations and dairy operations), and/or the like.

In some implementations, the architecture design platform may update a reference architecture to include data identifying the set of technology services. For example, the architecture design platform may be configured with a reference architecture that includes particular fields, objects, and/or the like (e.g., the reference architecture may be configured with a particular group of architecture tiers). In this case, the architecture design platform may update the reference architecture to include the data identifying the set of technology services. For example, the architecture design platform may be configured to update the reference architecture in a way that associates particular technology services with particular architecture tiers. As shown, the architecture design platform may update the reference architecture to associate the monitoring service with the edge tier, the database management service, the stream analytics service, and the machine learning service, with the platform tier, the user interface service with the enterprise tier, and the IAM service with the public tier.

In some implementations, the architecture design platform may identify the associations between the set of technical services and the architecture tiers. For example, many technology services may be hosted or supported by devices associated with multiple tiers (e.g., an edge device might have enough computing power to host a machine learning service, or a server that is part of the cloud might host the machine learning service). In this case, the architecture design platform may use one or more techniques described herein to identify which technical services are to be associated with each of the architecture tiers. For example, the architecture design platform may use a data model to predict the associations. In this example, a user might be more, or less, likely to place a technology service in a particular architecture tier based on an organization that employs the user, based on information about the user in the user profile, based on a type of problem that the user is tasked with solving, and/or the like.

In this way, the architecture design platform may include a set of technology services in the reference architecture that are predicted to be relevant to the user that is to use the reference architecture during the brainstorming session.

Figure 1E:
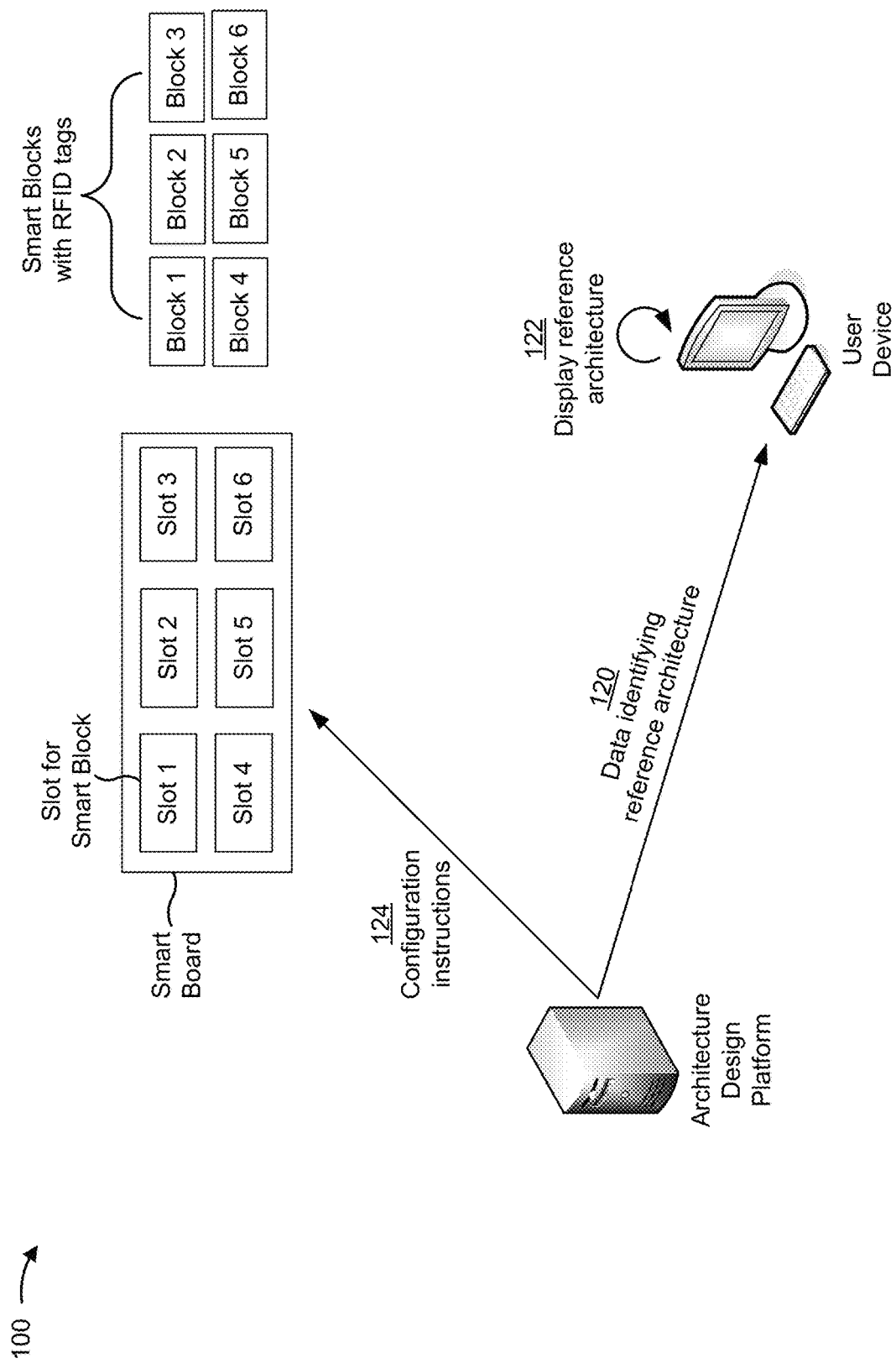

As shown in FIG. 1E, the architecture design platform may provide the user device and the smart board with information that may be used during the brainstorming session. For example, the brainstorming session may involve a group of users engaging in a discussion of the problem, design ideas relating to the application that is to serve as a solution to the problem, a software architecture that will support the application, and/or the like. In this case, and as shown by reference number 120, the architecture design platform may provide data identifying the reference architecture to the user device. As shown by reference number 122, the user device may display the reference architecture (e.g., via the interface of the reference architecture design tool). This may allow users to view the reference architecture during the brainstorming session.

As shown by reference number 124, the architecture design platform may provide configuration instructions to the smart board. The smart board may be used to improve user participation during the brainstorming session by offering an interactive way to make suggestions. For example, the group of individuals engaged in the brainstorming session may discuss different technology services that may be valuable to include or to use in the application and may select particular technology services by placing smart blocks (e.g., which are attachable components) into slots of the smart board.

In some implementations, the smart board may use the configuration instructions to configure the slots and/or the smart blocks. For example, the configuration instructions may include instructions indicating to (and/or indicating how to) configure the smart board and/or the smart blocks with data identifying the set of technology services that have been identified by the architecture design platform. In some cases, the configuration instructions may be used to configure a set of radio frequency identification (RFID) tags associated with the set of smart blocks. In this case, each smart block may be configured with a particular RFID tag that represents a particular technology service of the set of technology services identified by the architecture design platform. Additionally, the slots may include sensors that are capable of detecting when an RFID tag has been placed into one of the slots, capable of reading the RFID tag that has been detected, and/or the like.

In the depicted example, the smart board may include a set of six slots and a set of six smart blocks that may be attached to the slots. In this example, the six smart blocks may correspond to the six example technology services depicted in FIG. 1D (the monitoring service, the database management service, the stream analytics service, the machine learning service, the user interface service, and the IAM service). This may allow users in the brainstorming session to place smart blocks that correspond to particular technology services onto the smart board, which may cause the smart board to provide a notification to the architecture design platform (e.g., using a gateway or router as an intermediary) that indicates which technology services have been selected. In practice, the smart board may include any number of slots and/or smart blocks.

Additionally, or alternatively, another type of interactive device may be used in place of the smart board. For example, a device that supports virtual reality (VR), augmented reality (AR), an interactive white board, and/or the like, may be used in place of or in conjunction with the smart board. To provide a specific example, a VR headset may be available to use during the brainstorming session. In this example, the architecture design platform may provide the VR headset and/or a backend server with configuration instructions that allow one or more objects of a virtual environment to depict the set of technology services that were identified by the architecture design platform. This may allow users to interact with the one or more objects of the virtual environment to select particular technology services.

In this way, the architecture design platform may provide the user device and the smart board with information that may be used during the brainstorming session.

Figure 1F:
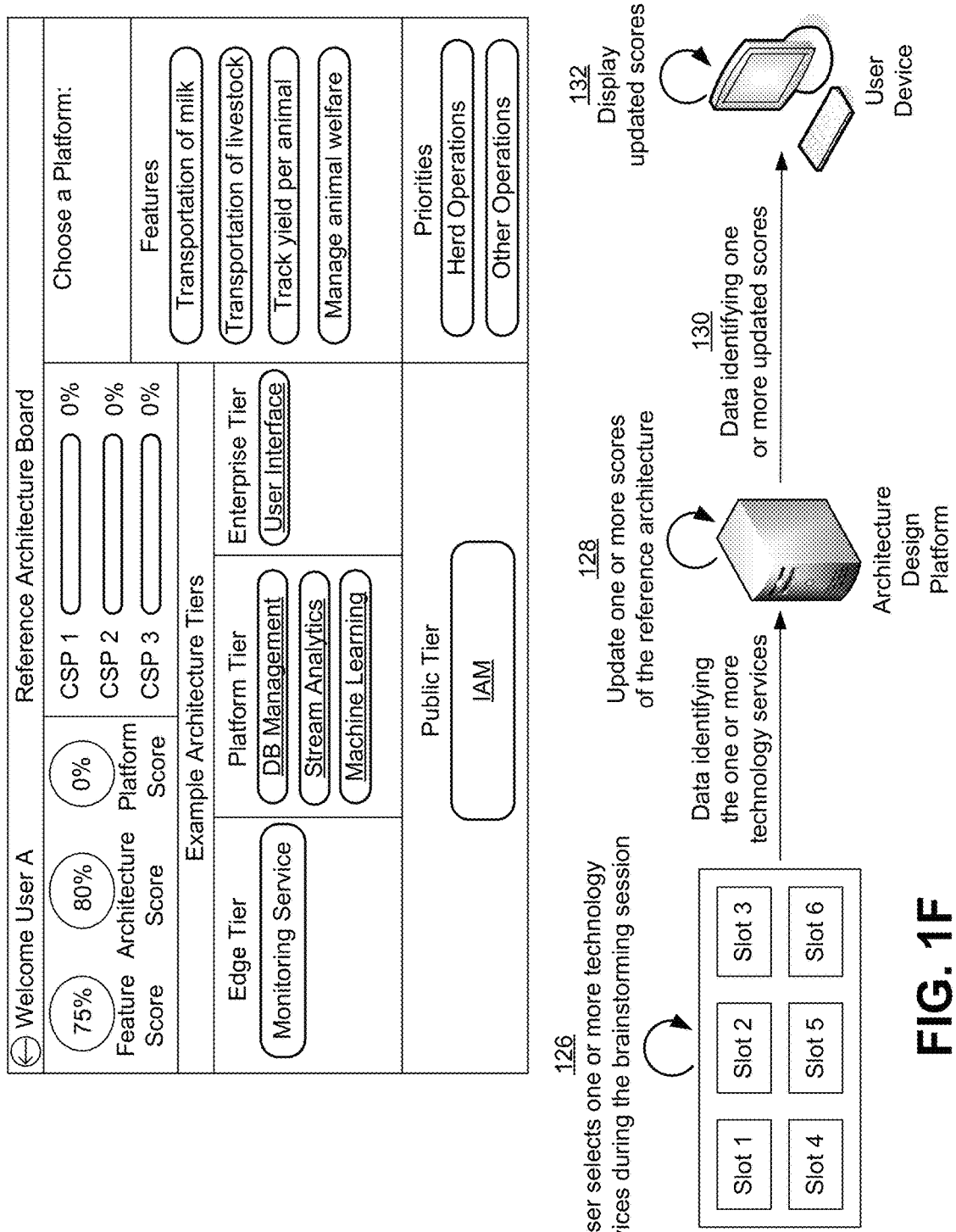

As shown in FIG. 1F, and by reference number 126, a user may select a technology service during the brainstorming session. For example, a group of users may collaborate during the brainstorming session to discuss which technology services may be relevant for the application that is being developed to detect and/or assist in preventing early stage hoof disease in cattle. In this case, when a user wants to select a technology service, the user may place a smart block into a slot of the smart board. The slot of the smart block may have a sensor that is able to detect that the smart block was placed into the slot and may read an RFID tag associated with the smart block. This may cause the smart board to send data identifying the technology service associated with the smart block to the architecture design platform (e.g., using the gateway or the router as an intermediary).

As shown by reference number 128, the architecture design platform may update one or more scores associated with the reference architecture based on the one or more technology services being selected. For example, the architecture design platform may update one or more scores that are impacted by the user selecting the one or more technology services. In this case, when the user selects the one or more technology services (referred to herein as the one or more selected technology services), the architecture design platform may update a first score (shown as a feature score) that indicates a degree to which the one or more selected technology services address, account for, and/or relate to the one or more features that have been selected, a second score (not shown) that indicates a degree to which the one or more selected technology services address, account for, and/or relate to the one or more priorities that have been selected, a third score (shown as the architecture score) that indicates a degree to which the one or more selected technology services represent a degree to which a set of architecture requirements has been satisfied, and/or the like.

As used herein, a technology service may be said to address, account for, and/or relate to a feature and/or a priority if the technology service is used to perform an action that addresses a concern associated with the feature and/or priority, an action that accounts for a problem associated with the feature and/or priority, an action that is related to the feature and/or the priority, and/or the like.

In some implementations, the architecture design platform may update one or more scores using a machine learning technique. For example, the architecture design platform may use machine learning to update the first score and/or the second score to reflect a degree to which the one or more selected technology services address, account for, and/or relate to the one or more priorities and/or the one or more features.

In this case, the architecture design platform may have trained a data model (or may have received a trained data model) that is able to use a machine learning technique to determine relations between selected priorities and/or features and selected technology services. The data model may have been trained using indicator values that identify trends, correlations, relationships, key performance indicator (KPI) values, and/or the like, between historical priorities and features and particular technology services.

To update the first score and/or the second score, the architecture design platform may provide the industry identifier, the data describing the problem, the priority data, the feature data, and/or the data identifying the one or more selected technology services as input to the data model, to cause the data model to output the updated first score and/or the updated second score which may indicate a degree to which the selected technology services address, account for, and/or relate to the one or more priorities and/or the one or more features.

As shown as an example, the architecture design platform may update the first score from a feature score indicating 0% to a feature score indicating 75%. In this example, the selected technology services may include the database management service, the stream analytics service, the machine learning service, the user interface service, and the IAM service. Additionally, the architecture design platform may provide the data identifying the selected technology services as input to the data model to cause the data model to output the feature score of 75%. This may be based on a conclusion that the selected technology services address and/or account for 75% of the features selected by the user (e.g., if transportation of milk requires a monitoring service, only three of the four features selected by the user may be addressed or accounted for by the selected technology services).

Additionally, or alternatively, the architecture design platform may update the third score. For example, the architecture design platform may update the third score to reflect a degree to which the one or more selected technology services represent a degree to which a set of architecture requirements has been satisfied. In this case, the architecture design platform may update the third score using a data model that has been trained in a manner similar to that described elsewhere herein. For example, the architecture design platform may provide the data identifying the one or more selected technology services as input to the data model in order to output the third score (or a value that may be used to determine the third score). In some cases, the third score may be based on a set of architecture requirements that must be satisfied for a software architecture to be considered complete. For example, the third score may be based on a number of available technology services that have been selected relative to a total number of recommended available technology services, based on whether at least one technology service has been selected for each architecture tier, based on a number of required technology services that have been selected, and/or the like.

Additionally, or alternatively, the architecture design platform may update one or more other values of the reference architecture. For example, the architecture design platform may update the part of the reference architecture that displays the tiers such that the one or more selected technology services appear under each respective tier. In the example shown, the architecture design platform may update the reference architecture to show the four technology services that have been selected by the user (shown as the four underlined technology services).

Additionally, or alternatively, the architecture design platform may update the reference architecture based on the user de-selecting a technology service. For example, the architecture design platform may receive, from the smart board, data identifying a technology service that has been de-selected based on the user removing a smart block from the smart board. In this case, when the smart block is removed from a slot of the smart board, the sensor associated with the slot may detect that the smart block has been removed, which may allow the smart board to provide the architecture design platform with the data identifying the technology service that has been de-selected. This may allow the architecture design platform to perform one or more actions described herein to update the reference architecture (e.g., by updating one or more of the scores, updating a value to remove the technology service from a corresponding tier of the reference architecture, and/or the like).

As shown by reference number 130, the architecture design platform may provide data identifying the one or more updated scores to the user device. As shown by reference number 132, the user device may display the data identifying the one or more updated scores (e.g., via the interface of the reference architecture design tool).

In this way, users may select one or more technology services and view a degree to which selection of the one or more technology services has impacted various aspects of the reference architecture.

Figure 1G:
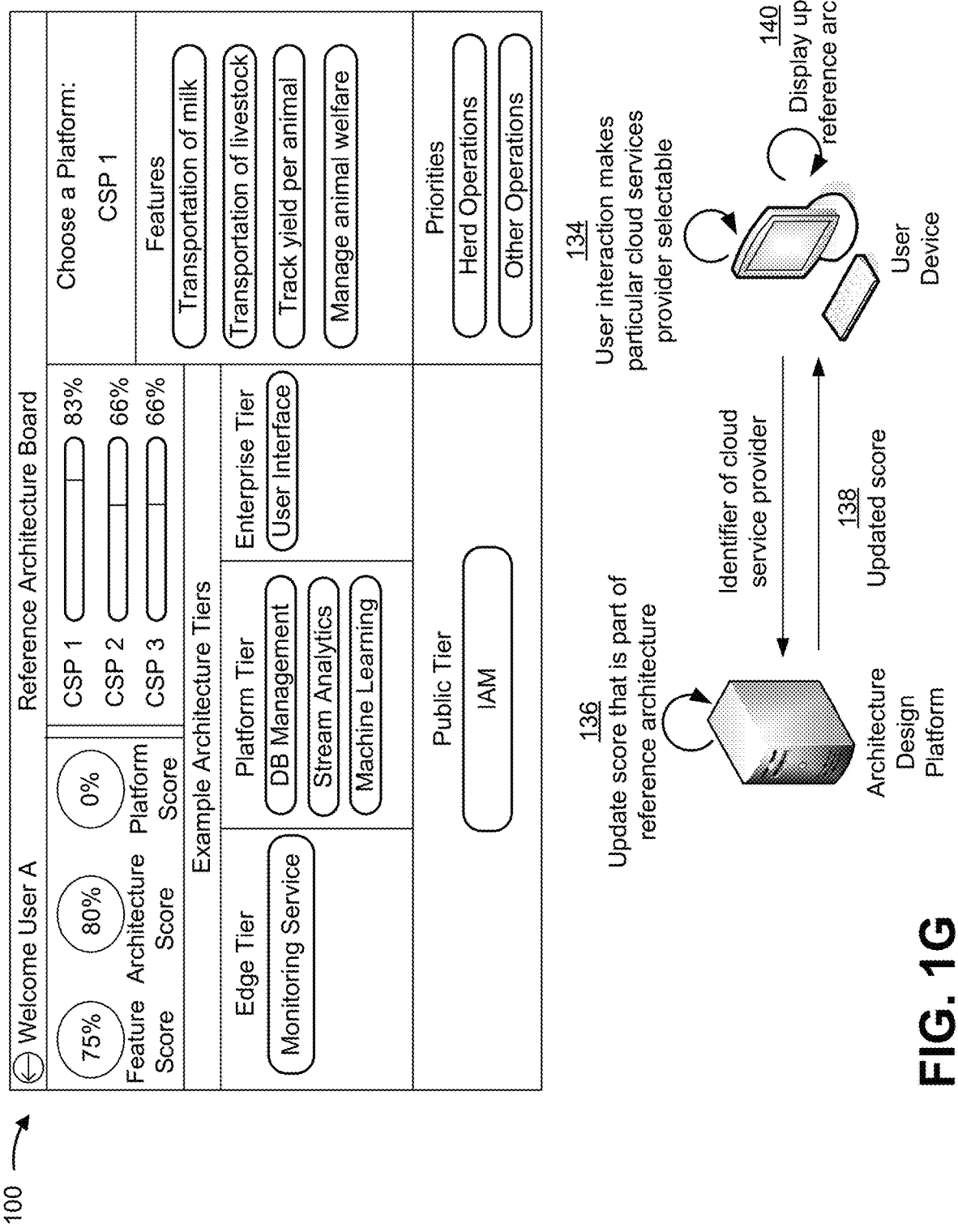

As shown in FIG. 1G, and by reference number 134, a user interaction may make a particular cloud service provider selectable via the interface. For example, the user may use a mouse to click through a list of cloud service providers and may mouseover at the particular cloud service provider. This may cause an identifier for the cloud service provider to be provided to the architecture design platform. In other cases, the user may type out a name of the cloud service provider, may select the cloud service provider (e.g., from a drop-down menu), and/or the like, which may also cause the data identifying the cloud service provider to be provided to the architecture design platform.

As shown by reference number 136, the architecture design platform may update a score that is part of the reference architecture. For example, the architecture design platform may, based on receiving the identifier of the cloud service provider, update a score that indicates a number of technology services that are offered by the cloud service provider (e.g., the cloud service provider may offer out-of-box solutions to particular technology services), a degree to which the cloud service provider offers the one or more selected technology services, and/or the like.

In this case, the architecture design platform may use the identifier of the cloud service provider to reference a data structure that associates a corresponding identifier and data identifying a list of technology services offered by the cloud service provider. This may allow the architecture design platform to compare the technology services that have been selected by the user to the list of technology services offered by the cloud service provider in order to determine the updated score.

In some implementations, the architecture design platform may use machine learning to update the score. For example, the architecture design platform may provide data identifying the one or more selected technology services as input to a data model, to cause the data model to output a set of service availability scores that reflect the degree to which the one or more cloud service providers offer the one or more selected technology services. The data model may have been trained in a manner consistent with and/or similar to that of other data models described elsewhere herein.

As shown by reference number 138, the architecture design platform may provide, to the user device, data identifying the updated score. As shown by reference number 140, the architecture design platform may provide the updated score for display on the interface of the reference architecture development tool.

As shown by way of example, if the user mouseovers such that a first cloud service provider is selectable (shown as CSP 1), the architecture design platform may provide an updated score to the user device that indicates that the first cloud service provider offers out-of-box solutions for 83% of the technology services. If the user were to engage in a similar process for a second cloud service provider or for a third cloud service provider, the user might learn that each of the second and third cloud service providers offers out-of-box solutions for 66% of the technology services.

In some implementations, the user device may perform one or more actions described herein as being performed by the architecture design platform. For example, the user device may be configured with the reference architecture development tool and/or one or more data models described herein (or one or more lightweight versions of the one or more data models). This may allow the user device to generate and update the reference architecture without relying on the computational power of the architecture design platform. This conserves network resources by providing implementations that may be performed without a need for network connectivity.

In this way, the architecture design platform provides the user with a reference architecture that assists the user with selecting technology services, with selecting a cloud service provider, and/or the like. Additionally, when a user-driven action occurs that changes the reference architecture (e.g., the user may add a technology service to and/or may remove a technology service from the one or more selected technology services), the architecture design platform may dynamically update one or more scores to reflect an impact that the change may have on developing a solution associated with the one or more priorities and/or the one or more features that have been selected, updates a score to reflect an impact that the change may have on selecting a cloud service provider, and/or the like. By understanding an impact that a change has on selection of a cloud service provider, the user is able to select a best-fit cloud service provider, thereby conserving resources (e.g., processing resources, network resources, memory resources, and/or the like) that would be wasted generating aspects of the application that are offered by the best-fit cloud service provider but not offered by the selected cloud service provider.

As indicated above, FIGS. 1A-1G are provided merely as an example. Other examples may differ from what is described with regard to FIGS. 1A-1G. For example, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple and/or distributed devices. Additionally, or alternatively, a set of devices (e.g., one or more devices) of example implementation 100 may perform one or more functions described as being performed by another set of devices of example implementation 100.

Figure 2:
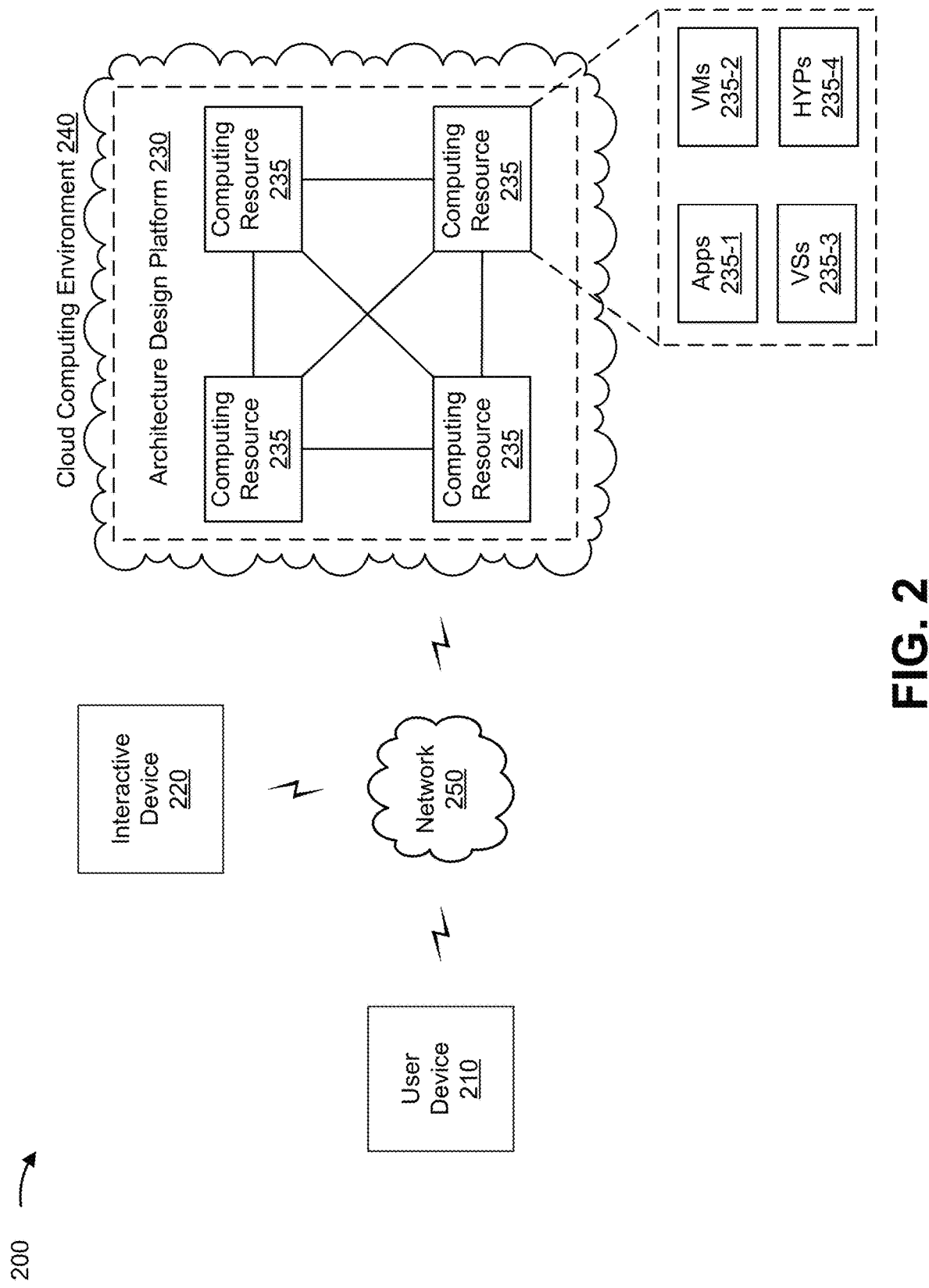
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an interactive device 220, an architecture design platform 230 supported within a cloud computing environment 240, and/or a network 250. Devices of environment 200 may interconnect via wired connections, wireless connections, or a combination of wired and wireless connections.

User device 210 includes one or more devices capable of receiving, generating, storing, processing, and/or providing information associated with a reference architecture. For example, user device 210 may include a device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may be configured with or may have access to a reference architecture design tool that is used to display the reference architecture (e.g., which may be used as part of a brainstorming session). In some implementations, user device 210 may provide information to architecture design platform 230 that may be included as part of the reference architecture (e.g., an identifier of an industry, text describing a problem that is to be discussed during a brainstorming session, priority data, feature data, and/or the like). In some implementations, user device 210 may receive, from architecture design platform 230, data identifying the reference architecture. In some implementations, user device 210 may receive, from architecture design platform 230, a set of scores that have been updated and that are part of the reference architecture.

Interactive device 220 includes one or more devices capable of receiving, storing, generating, determining, and/or providing information associated with the reference architecture. For example, interactive device 220 may include a server device, a group of server devices, a smart device that can utilize radio-frequency identification (RFID) technology (e.g., a smart board), a device that supports virtual reality (VR) and/or augmented reality (AR) (e.g., a VR or AR headset, a mobile phone, a laptop computer, and/or the like), an interactive white board, or a similar type of device that can provide an interactive experience for a user. In some implementations, interactive device 220 may receive configuration instructions from architecture design platform 230. In some implementations, interactive device 220 may communicate with user device 210. In some implementations, interactive device 220 may provide data identifying a technology service to architecture design platform 230.

Architecture design platform 230 includes one or more devices capable of receiving, storing, processing, including, determining, providing, and/or updating information associated with the reference architecture. For example, architecture design platform 230 may include a server device (e.g., a host server, a web server, an application server, etc.), a data center device, or a similar device. In some implementations, architecture design platform 230 may perform one or more actions associated with including information as part of the reference architecture and/or updating the reference architecture, as described herein.

In some implementations, as shown, architecture design platform 230 may be hosted in cloud computing environment 240. Notably, while implementations described herein describe architecture design platform 230 as being hosted in cloud computing environment 240, in some implementations, architecture design platform 230 may not be cloud-based (i.e., may be implemented outside of a cloud computing environment) or may be partially cloud-based.

Cloud computing environment 240 includes an environment that hosts architecture design platform 230. Cloud computing environment 240 may provide computation, software, data access, storage, etc. services that do not require end-user knowledge of a physical location and configuration of system(s) and/or device(s) that hosts architecture design platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host architecture design platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210 and/or interactive device 220. Application 235-1 may eliminate a need to install and execute the software applications on these devices. In some implementations, one application 235-1 may send/receive information to/from one or more other applications 235-1, via virtual machine 235-2. In some implementations, application 235-1 may include a reference architecture design tool.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, interactive device 220, etc.), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
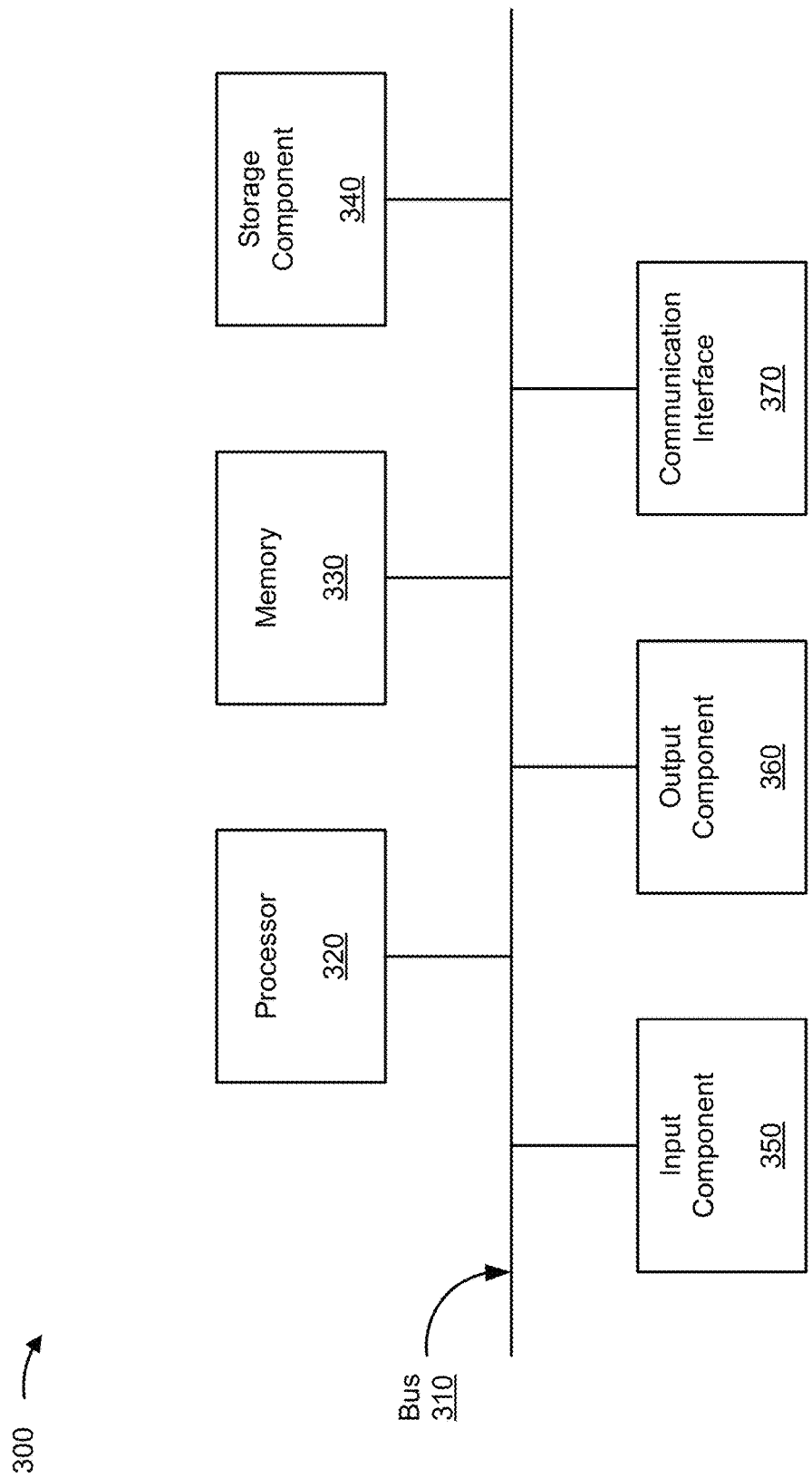
FIG. 3 is a diagram of example components of one or more devices of FIG. 2.

FIG. 3 is a diagram of example components of a device 300. Device 300 may correspond to user device 210, interactive device 220, and/or architecture design platform 230. In some implementations, user device 210, interactive device 220, and/or architecture design platform 230 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
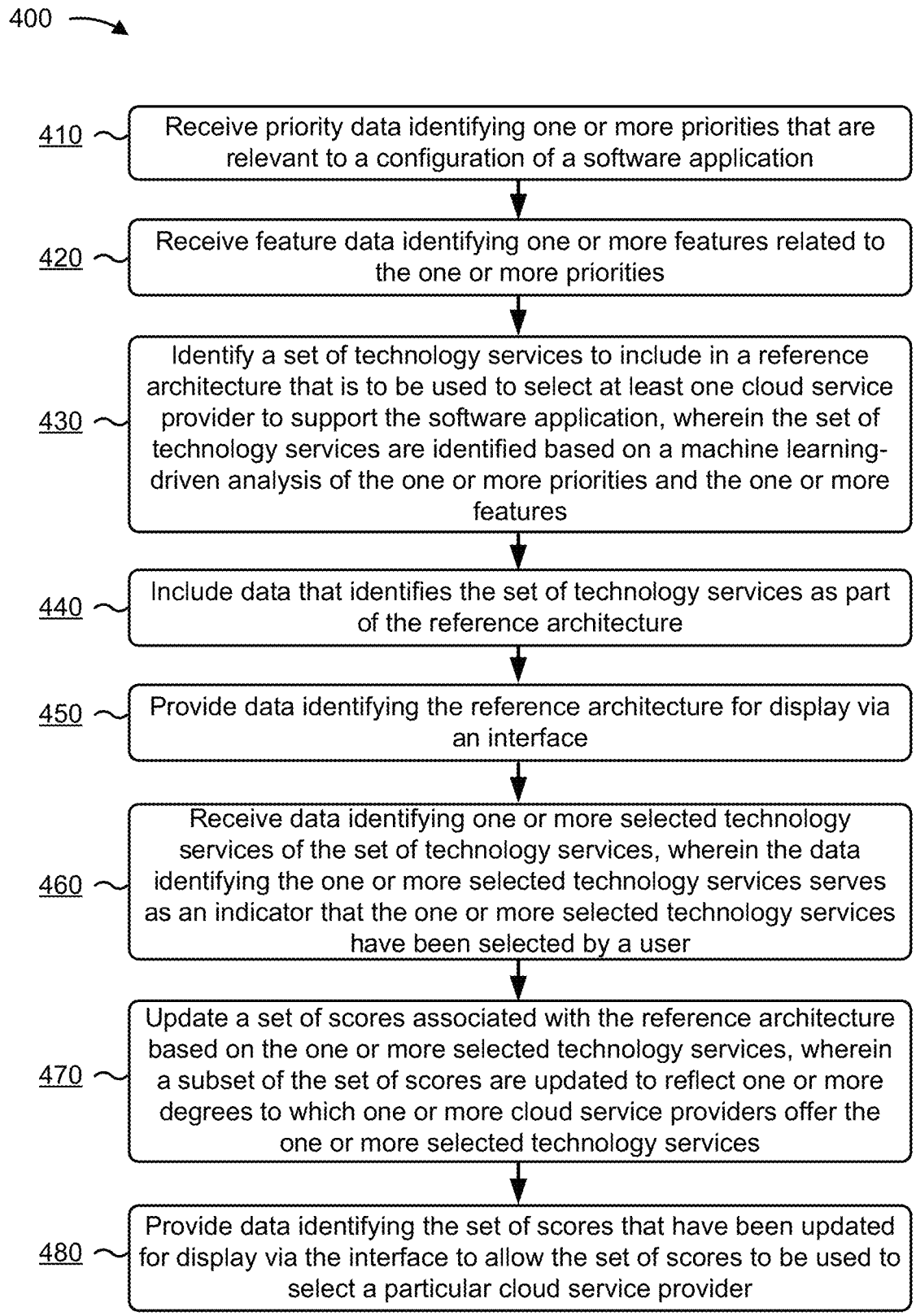
FIGS. 4-6 are flow charts of one or more example processes for providing an interactive, machine learning-driven solution to designing and updating a reference architecture.

FIG. 4 is a flow chart of an example process 400 for providing an interactive, machine learning-driven solution to designing and updating a reference architecture. In some implementations, one or more process blocks of FIG. 4 may be performed by an architecture design platform (e.g., architecture design platform 230). In some implementations, one or more process blocks of FIG. 4 may be performed by another device or a group of devices separate from or including the architecture design platform, such as a user device (e.g., user device 210), an interactive device (e.g., interactive device 220), and/or the like.

As shown in FIG. 4, process 400 may comprise receiving priority data identifying one or more priorities that are relevant to a configuration of a software application (block 410). For example, the architecture design platform (e.g., using computing resource 235, processor 320, memory 330, storage component 340, input component 350, communication interface 370, and/or the like) may receive priority data identifying one or more priorities that are relevant to a configuration of a software application, as described above. In some implementations, the one or more priorities may be said to be "relevant to the configuration of a software application" because the software application is to be designed and/or configured in a manner that addresses, accounts for, and/or relates to the one or more priorities.

As further shown in FIG. 4, process 400 may comprise receiving feature data identifying one or more features related to the one or more priorities (block 420). For example, the architecture design platform (e.g., using computing resource 235, processor 320, memory 330, storage component 340, input component 350, communication interface 370, and/or the like) may receive feature data identifying one or more features related to the one or more priorities, as described above.

As further shown in FIG. 4, process 400 may comprise identifying a set of technology services to include in a reference architecture that is to be used to select at least one cloud service provider to support the software application, wherein the set of technology services are identified based on a machine learning-driven analysis of the one or more priorities and the one or more features (block 430). For example, the architecture design platform (e.g., using computing resource 235, processor 320, memory 330, storage component 340, and/or the like) may identify a set of technology services to include in a reference architecture that is to be used to select at least one cloud service provider to support the software application, as described above. In some implementations, the set of technology services may be identified based on a machine learning-driven analysis of the one or more priorities and the one or more features.

As further shown in FIG. 4, process 400 may comprise including data that identifies the set of technology services as part of the reference architecture (block 440). For example, the architecture design platform (e.g., using computing resource 235, processor 320, memory 330, storage component 340, and/or the like) may include the data that identifies the set of technology services as part of the reference architecture, as described above.

In some implementations, the architecture design platform may include the data that identifies the set of technology services as part of the reference architecture by populating the reference architecture with the data that identifies the set of technology services. For example, the architecture design platform may be configured with or have access to a template of the reference architecture that includes particular fields. In this case, the architecture design platform may populate values that correspond to the particular fields with the data that identifies the set of technology services. As an example, a field may be an architecture tier (an edge tier, a platform tier, an enterprise tier, and/or the like) and a value may be a specific technology service (e.g., a monitoring service, a database management service, a stream analytics service, and/or the like). In some implementations, the architecture design platform may generate the reference architecture to include the data that identifies the set of technology services. For example, rather than utilize a templated or pre-configured reference architecture, the architecture design platform may generate fields for the reference architecture (e.g., based on configuration rules, user preferences, and/or the like), and may include the data that identifies the set of technology services as values that correspond to the fields.

As further shown in FIG. 4, process 400 may comprise providing data identifying the reference architecture for display via an interface (block 450). For example, the architecture design platform (e.g., using computing resource 235, processor 320, memory 330, storage component 340, output component 360, communication interface 370, and/or the like) may provide data identifying the reference architecture for display via an interface, as described above.

As further shown in FIG. 4, process 400 may comprise receiving data identifying one or more selected technology services of the set of technology services, wherein the data identifying the one or more selected technology services serves as an indicator that the one or more selected technology services have been selected by a user (block 460). For example, the architecture design platform (e.g., using computing resource 235, processor 320, memory 330, storage component 340, input component 350, communication interface 370, and/or the like) may receive data identifying one or more selected technology services of the set of technology services, as described above. In some implementations, the data identifying the one or more selected technology services may serve as an indicator that the one or more selected technology services have been selected by a user.

As further shown in FIG. 4, process 400 may comprise updating a set of scores associated with the reference architecture based on the one or more selected technology services, wherein a subset of the set of scores are updated to reflect one or more degrees to which one or more cloud service providers offer the one or more selected technology services (block 470). For example, the architecture design platform (e.g., using computing resource 235, processor 320, memory 330, storage component 340, input component 350, communication interface 370, and/or the like) may update a set of scores associated with the reference architecture based on the one or more selected technology services, as described above. In some implementations, a subset of the set of scores may be updated to reflect one or more degrees to which one or more cloud service providers offer the one or more selected technology services.

As further shown in FIG. 4, process 400 may comprise providing data identifying the set of scores that have been updated for display via the interface to allow the set of scores to be used to select a particular cloud service provider (block 480). For example, the architecture design platform (e.g., using computing resource 235, processor 320, memory 330, storage component 340, output component 360, communication interface 370, and/or the like) may provide data identifying the set of scores that have been updated for display via the interface to allow the set of scores to be used to select a particular cloud service provider, as described above.

Process 400 may comprise additional implementations, such as any single implementation or any combination of implementations described below and/or in connection with one or more other processes described elsewhere herein.

In some implementations, the architecture design platform may provide, after including the data that identifies the set of technology services as part of the reference architecture, configuration instructions to a smart device to cause the smart device and a set of attachable components of the smart device to be configured with the data identifying the set of technology services. In some implementations, when receiving the data identifying the one or more selected technology services, the architecture design platform may receive, from the smart device and based on one or more attachable components, of the set of attachable components, being attached to the smart device, at least one of: the data identifying the one or more selected technology services or one or more identifiers indicating which of the one or more of the attachable components were attached to the smart device.

In some implementations, the architecture design platform may provide, after including the data that identifies the set of technology services as part of the reference architecture, configuration instructions to a particular device supporting virtual reality (VR) or augmented reality (AR) to cause the particular device to display the data identifying the set of technology services. In some implementations, when receiving the data identifying the one or more selected technology services, the architecture design platform may receive the data identifying the one or more selected technology services from the particular device. The data identifying the one or more selected technology services may serve as a particular indicator that the user has interacted with a virtual environment to select the one or more selected technology services.

In some implementations, the set of technology services may include at least one of: a database management service, an enterprise integration service, a user interface service, a machine learning service, a monitoring service, an analytics service, or a security service.

In some implementations, the feature data identifying the one or more features may be particular feature data. In some implementations, the architecture design platform may provide the priority data as input to a data model to cause the data model to output a set of feature scores identifying a likelihood of particular features being related to the one or more priorities. In some implementations, the architecture design platform may determine that a subset of the set of feature scores satisfy a threshold confidence level, may identify recommended features associated with the subset of the set of feature scores that satisfy the threshold confidence level, and may provide feature data identifying the recommended features for display via the interface. The feature data identifying the recommended features may include the particular feature data identifying the one or more features that are to be selected.

In some implementations, when updating the set of scores, the architecture design platform may provide data identifying the one or more selected technology services as input to a data model, to cause the data model to output a set of service availability scores that reflect the one or more degrees to which the one or more cloud service providers offer the one or more selected technology services. The set of service availability scores may be the subset of the set of scores.

In some implementations, the subset of the set of scores may be a first subset, and the set of scores may include at least one of: a second subset of the set of scores that indicate degrees to which the one or more selected technology services account for the one or more features, or a third subset of the set of scores indicating one or more degrees to which the one or more selected technology services have satisfied a set of architecture requirements.

Although FIG. 4 shows example blocks of process 400, in some implementations, process 400 may comprise additional blocks, fewer blocks, different blocks, or differently arranged blocks than those depicted in FIG. 4. Additionally, or alternatively, two or more of the blocks of process 400 may be performed in parallel.

Figure 5:
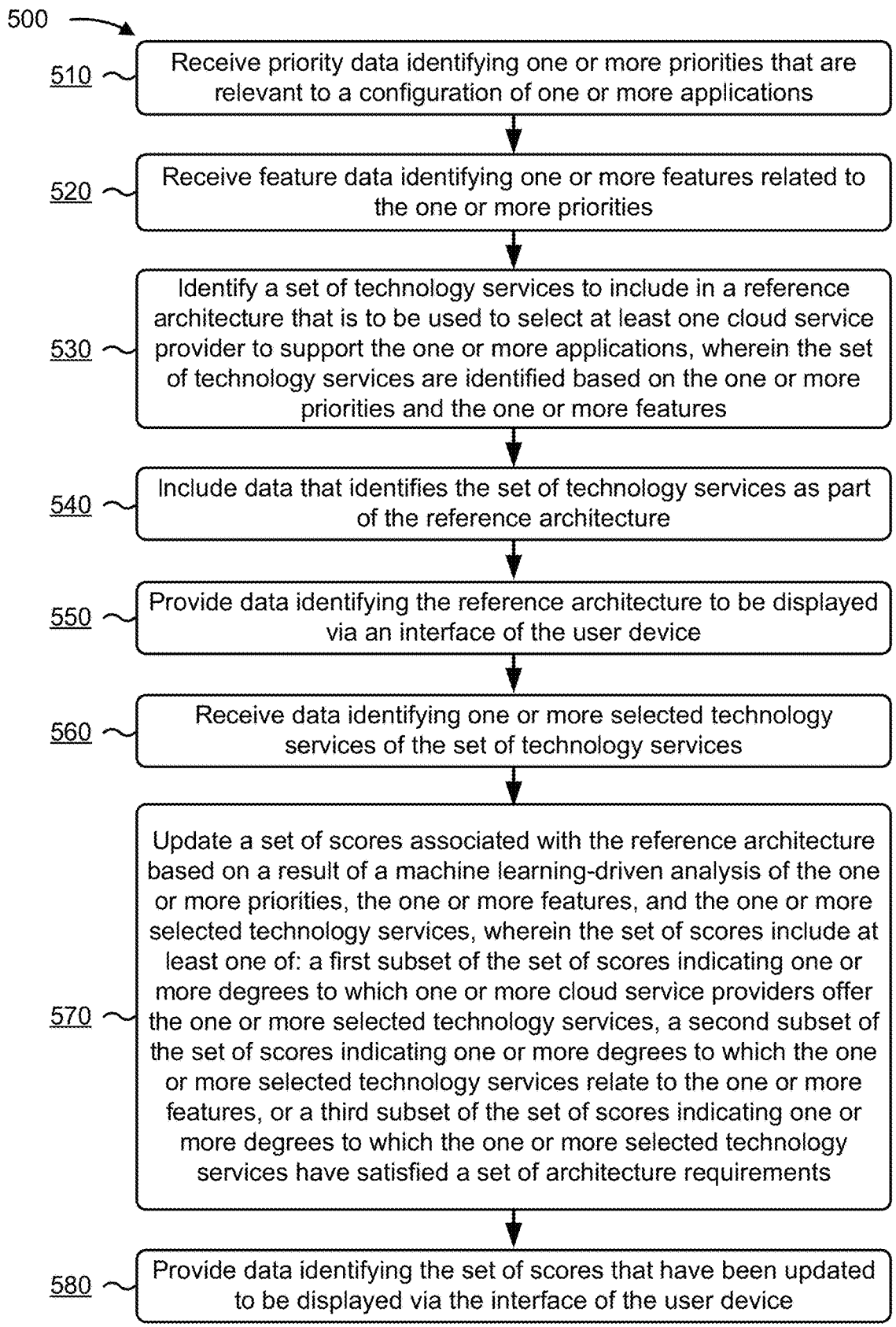

FIG. 5 is a flow chart of an example process 500 for providing an interactive, machine learning-driven solution to designing and updating a reference architecture. In some implementations, one or more process blocks of FIG. 5 may be performed by an architecture design platform (e.g., architecture design platform 230). In some implementations, one or more process blocks of FIG. 5 may be performed by another device or a group of devices separate from or including the architecture design platform, such as a user device (e.g., user device 210), an interactive device (e.g., interactive device 220), and/or the like.

As shown in FIG. 5, process 500 may comprise receiving, from a user device, priority data identifying one or more priorities that are relevant to a configuration of one or more applications (block 510). For example, the architecture design platform (e.g., using computing resource 235, processor 320, memory 330, storage component 340, input component 350, communication interface 370, and/or the like) may receive, from the user device (e.g., user device 210), priority data identifying one or more priorities that are relevant to a configuration of one or more applications, as described above.

As further shown in FIG. 5, process 500 may comprise receiving, from the user device, feature data identifying one or more features related to the one or more priorities (block 520). For example, the architecture design platform (e.g., using computing resource 235, processor 320, memory 330, storage component 340, input component 350, communication interface 370, and/or the like) may receive, from the user device, feature data identifying one or more features related to the one or more priorities, as described above.

As further shown in FIG. 5, process 500 may comprise identifying a set of technology services to include in a reference architecture that is to be used to select at least one cloud service provider to support the one or more applications, wherein the set of technology services are identified based on the one or more priorities and the one or more features (block 530). For example, the architecture design platform (e.g., using computing resource 235, processor 320, memory 330, storage component 340, and/or the like) may identify a set of technology services to include in a reference architecture that is to be used to select at least one cloud service provider to support the one or more applications, as described above. In some implementations, the set of technology services may be identified based on the one or more priorities and the one or more features.

As further shown in FIG. 5, process 500 may comprise including the data that identifies the set of technology services as part of the reference architecture (block 540). For example, the architecture design platform (e.g., using computing resource 235, processor 320, memory 330, storage component 340, and/or the like) may include the data that identifies the set of technology services as part of the reference architecture, as described above.

In some implementations, the architecture design platform may include the data that identifies the set of technology services as part of the reference architecture by populating the reference architecture with the data that identifies the set of technology services. For example, the architecture design platform may be configured with or have access to a template of the reference architecture that includes particular fields. In this case, the architecture design platform may populate values that correspond to the particular fields with the data that identifies the set of technology services. As an example, a field may be an architecture tier (an edge tier, a platform tier, an enterprise tier, and/or the like) and a value may be a specific technology service (e.g., a monitoring service, a database management service, a stream analytics service, and/or the like). In some implementations, the architecture design platform may generate the reference architecture to include the data that identifies the set of technology services. For example, rather than utilize a templated or pre-configured reference architecture, the architecture design platform may generate fields for the reference architecture (e.g., based on configuration rules, user preferences, and/or the like), and may include the data that identifies the set of technology services as values that correspond to the fields.

As further shown in FIG. 5, process 500 may comprise providing data identifying the reference architecture to be displayed via an interface of the user device (block 550). For example, the architecture design platform (e.g., using computing resource 235, processor 320, memory 330, storage component 340, output component 360, communication interface 370, and/or the like) may provide data identifying the reference architecture to be displayed via an interface of the user device, as described above.

As further shown in FIG. 5, process 500 may comprise receiving data identifying one or more selected technology services of the set of technology services (block 560). For example, the architecture design platform (e.g., using computing resource 235, processor 320, memory 330, storage component 340, input component 350, communication interface 370, and/or the like) may receive data identifying one or more selected technology services of the set of technology services, as described above.

As further shown in FIG. 5, process 500 may comprise updating a set of scores associated with the reference architecture based on a result of a machine learning-driven analysis of the one or more priorities, the one or more features, and the one or more selected technology services, wherein the set of scores include at least one of: a first subset of the set of scores indicating one or more degrees to which one or more cloud service providers offer the one or more selected technology services, a second subset of the set of scores indicating one or more degrees to which the one or more selected technology services relate to the one or more features, or a third subset of the set of scores indicating one or more degrees to which the one or more selected technology services have satisfied a set of architecture requirements (block 570). For example, the architecture design platform (e.g., using computing resource 235, processor 320, memory 330, storage component 340, and/or the like) may update a set of scores associated with the reference architecture based on a result of a machine learning-driven analysis of the one or more priorities, the one or more features, and the one or more selected technology services, as described above. In some implementations, the set of scores may include at least one of: a first subset of the set of scores indicating one or more degrees to which one or more cloud service providers offer the one or more selected technology services, a second subset of the set of scores indicating one or more degrees to which the one or more selected technology services relate to the one or more features, or a third subset of the set of scores indicating one or more degrees to which the one or more selected technology services have satisfied a set of architecture requirements.

As further shown in FIG. 5, process 500 may comprise providing data identifying the set of scores that have been updated to be displayed via the interface of the user device (block 580). For example, the architecture design platform (e.g., using computing resource 235, processor 320, memory 330, storage component 340, output component 360, communication interface 370, and/or the like) may provide data identifying the set of scores that have been updated to be displayed via the interface of the user device, as described above.

Process 500 may comprise additional implementations, such as any single implementation or any combination of implementations described below and/or in connection with one or more other processes described elsewhere herein.

In some implementations, the architecture design platform may provide, after including the data that identifies the set of technology services as part of the reference architecture, configuration instructions to another device (e.g., interactive device 220) to allow the other device to use the configuration instructions to provide an interactive display of the set of technology services, and, when receiving the data identifying the one or more selected technology services, the architecture design platform may receive the data identifying the one or more selected technology services from the other device.

In some implementations, the one or more priorities may include one or more priorities directed to a particular industry, one or more priorities directed to organizational processes (e.g., as shown in FIGS. 1A-1G by way of example, dairy operations, herd operations, and/or the like), and/or one or more priorities directed to organizational concepts (e.g., as described in FIG. 1A by way of example, worker safety, worker efficiency, and/or the like). In some implementations, the one or more features may include one or more features that identify tasks of the one or more organizational processes and/or one or more features that identify properties of the one or more organizational concepts.

In some implementations, the priority data identifying the one or more priorities may be particular priority data, and the architecture design platform may receive, from the user device, data describing a problem to be addressed by the one or more applications. In some implementations, the architecture design platform may analyze the data describing the problem using one or more natural language processing techniques to determine a problem type, may identify recommended priorities by referencing a data structure that associates the recommended priorities with an identifier of the problem type, and may provide priority data identifying the recommended priorities for display via the interface. The priority data identifying the recommended priorities may include the particular priority data identifying the one or more priorities.

In some implementations, the feature data identifying the one or more features may be particular feature data, and the architecture design platform may analyze the priority data using one or more natural language processing techniques to determine a feature type. In some implementations, the architecture design platform may identify recommended features by referencing a data structure that associates the recommended features with an identifier of the feature type and may provide priority data identifying the recommended features for display via the interface of the user device. The priority data identifying the recommended features may include the particular feature data identifying the one or more features.

In some implementations, when identifying the set of technology services, the architecture design platform may provide the priority data and the feature data as input to a data model to cause the data model to output a set of relevancy scores indicating one or more degrees to which particular technology services included in a list of technology services are relevant to the one or more priorities and/or the one or more features. The set of technology services may be included in the list of technology services, and the architecture design platform may determine that a subset of the set of relevancy scores, which are associated with the set of technology services, satisfy a threshold confidence level. In some implementations, the architecture design platform may identify the set of technology services based on the subset of the set of relevancy scores satisfying the threshold confidence level.

In some implementations, when updating the set of scores, the architecture design platform may provide data identifying the one or more selected technology services as input to a data model, to cause the data model to output a set of service availability scores that reflect the degree to which the one or more cloud service providers offer the one or more selected technology services. The set of service availability scores may be the first subset of the set of scores.

Although FIG. 5 shows example blocks of process 500, in some implementations, process 500 may comprise additional blocks, fewer blocks, different blocks, or differently arranged blocks than those depicted in FIG. 5. Additionally, or alternatively, two or more of the blocks of process 500 may be performed in parallel.

Figure 6:
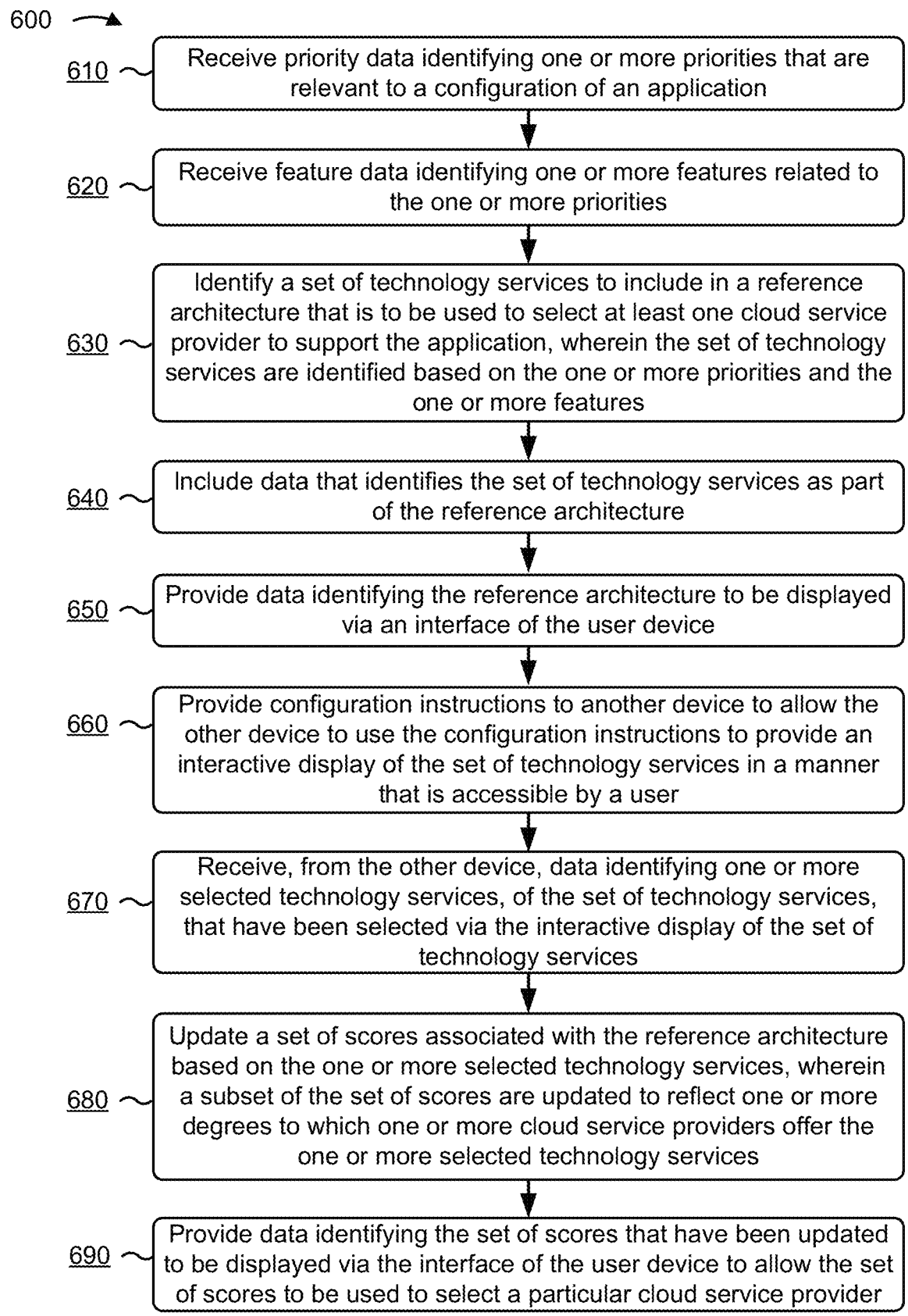

FIG. 6 is a flow chart of an example process 600 for providing an interactive, machine learning-driven solution to designing and updating a reference architecture. In some implementations, one or more process blocks of FIG. 6 may be performed by an architecture design platform (e.g., architecture design platform 230). In some implementations, one or more process blocks of FIG. 6 may be performed by another device or a group of devices separate from or including the architecture design platform, such as a user device (e.g., user device 210), an interactive device (e.g., interactive device 220), and/or the like.

As shown in FIG. 6, process 600 may comprise receiving, from a user device, priority data identifying one or more priorities that are relevant to a configuration of an application (block 610). For example, the architecture design platform (e.g., using computing resource 235, processor 320, memory 330, storage component 340, input component 350, communication interface 370, and/or the like) may receive, from the user device (e.g., user device 210), priority data identifying one or more priorities that are relevant to a configuration of an application, as described above.

As further shown in FIG. 6, process 600 may comprise receiving, from the user device, feature data identifying one or more features related to the one or more priorities (block 620). For example, the architecture design platform (e.g., using computing resource 235, processor 320, memory 330, storage component 340, input component 350, communication interface 370, and/or the like) may receive, from the user device, feature data identifying one or more features related to the one or more priorities, as described above.

As further shown in FIG. 6, process 600 may comprise identifying a set of technology services to include in a reference architecture that is to be used to select at least one cloud service provider to support the application, wherein the set of technology services are identified based on the one or more priorities and the one or more features (block 630). For example, the architecture design platform (e.g., using computing resource 235, processor 320, memory 330, storage component 340, and/or the like) may identify a set of technology services to include in a reference architecture that is to be used to select at least one cloud service provider to support the application, as described above. In some implementations, the set of technology services may be identified based on the one or more priorities and the one or more features.

As further shown in FIG. 6, process 600 may comprise including data that identifies the set of technology services as part of the reference architecture (block 640). For example, the architecture design platform (e.g., using computing resource 235, processor 320, memory 330, storage component 340, and/or the like) may include data that identifies the set of technology services as part of the reference architecture, as described above.

In some implementations, the architecture design platform may include the data that identifies the set of technology services as part of the reference architecture by populating the reference architecture with the data that identifies the set of technology services. For example, the architecture design platform may be configured with or have access to a template of the reference architecture that includes particular fields. In this case, the architecture design platform may populate values that correspond to the particular fields with the data that identifies the set of technology services. As an example, a field may be an architecture tier (an edge tier, a platform tier, an enterprise tier, and/or the like) and a value may be a specific technology service (e.g., a monitoring service, a database management service, a stream analytics service, and/or the like). In some implementations, the architecture design platform may generate the reference architecture to include the data that identifies the set of technology services. For example, rather than utilize a templated or pre-configured reference architecture, the architecture design platform may generate fields for the reference architecture (e.g., based on configuration rules, user preferences, and/or the like), and may include the data that identifies the set of technology services as values that correspond to the fields.

As further shown in FIG. 6, process 600 may comprise providing data identifying the reference architecture to be displayed via an interface of the user device (block 650). For example, the architecture design platform (e.g., using computing resource 235, processor 320, memory 330, storage component 340, output component 360, communication interface 370, and/or the like) may provide data identifying the reference architecture to be displayed via an interface of the user device, as described above.

As further shown in FIG. 6, process 600 may comprise providing configuration instructions to another device to allow the other device to use the configuration instructions to provide an interactive display of the set of technology services in a manner that is accessible by a user (block 660). For example, the architecture design platform (e.g., using computing resource 235, processor 320, memory 330, storage component 340, output component 360, communication interface 370, and/or the like) may provide configuration instructions to another device to allow the other device to use the configuration instructions to provide an interactive display of the set of technology services in a manner that is accessible by a user, as described above.

As further shown in FIG. 6, process 600 may comprise receiving, from the other device, data identifying one or more selected technology services, of the set of technology services, that have been selected via the interactive display of the set of technology services (block 670). For example, the architecture design platform (e.g., using computing resource 235, processor 320, memory 330, storage component 340, input component 350, communication interface 370, and/or the like) may receive, from the other device, data identifying one or more selected technology services, of the set of technology services, that have been selected via the interactive display of the set of technology services, as described above.

As further shown in FIG. 6, process 600 may comprise updating a set of scores associated with the reference architecture based on the one or more selected technology services, wherein a subset of the set of scores are updated to reflect one or more degrees to which one or more cloud service providers offer the one or more selected technology services (block 680). For example, the architecture design platform (e.g., using computing resource 235, processor 320, memory 330, storage component 340, and/or the like) may update a set of scores associated with the reference architecture based on the one or more selected technology services, as described above. In some implementations, a subset of the set of scores may be updated to reflect one or more degrees to which one or more cloud service providers offer the one or more selected technology services, As further shown in FIG. 6, process 600 may comprise providing data identifying the set of scores that have been updated to be displayed via the interface of the user device to allow the set of scores to be used to select a particular cloud service provider (block 690). For example, the architecture design platform (e.g., using computing resource 235, processor 320, memory 330, storage component 340, output component 360, communication interface 370, and/or the like) may provide data identifying the set of scores that have been updated to be displayed via the interface of the user device to allow the set of scores to be used to select a particular cloud service provider, as described above.

Process 600 may comprise additional implementations, such as any single implementation or any combination of implementations described below and/or in connection with one or more other processes described elsewhere herein.

In some implementations, the other device may be a smart device that includes a set of attachable components used to provide the interactive display, or a particular device supporting virtual reality (VR) or augmented reality (AR) that uses a virtual environment to provide the interactive display. In some implementations, the set of technology services may include a database management service, an enterprise integration service, a user interface service, a machine learning service, a monitoring service, an analytics service, and/or a security service.

In some implementations, when identifying the set of technology services, the architecture design platform may provide the priority data and the feature data as input to a data model, to cause the data model to output a set of relevancy scores indicating one or more degrees to which particular technology services included in a list of technology services are relevant to the one or more priorities and the one or more features. The set of technology services may be included in the list of technology services. In some implementations, the architecture design platform may determine that a subset of the set of relevancy scores, which are associated with the set of technology services, satisfy a threshold confidence level, and may identify the set of technology services based on the subset of the set of relevancy scores satisfying the threshold confidence level.

In some implementations, when updating the set of scores, the architecture design platform may provide data identifying the one or more selected technology services as input to a data model, to cause the data model to output a set of service availability scores that reflect the degree to which the one or more cloud service providers offer the one or more selected technology services. The set of service availability scores may be the subset of the set of scores.

In some implementations, the subset of the set of scores may be a first subset, and the set of scores may include a second subset of the set of scores that indicate one or more degrees to which the one or more selected technology services relate to the one or more features, and/or a third subset of the set of scores indicating one or more degrees to which the one or more selected technology services have satisfied a set of architecture requirements.

Although FIG. 6 shows example blocks of process 600, in some implementations, process 600 may comprise additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, priority data identifying one or more priorities that are relevant to a configuration of a software application;
   providing, by the device, the priority data as input to a data model to cause the data model to output a set of feature scores identifying a likelihood of one or more features being related to the one or more priorities;
   identifying, by the device, recommended features, of the one or more features, based on the set of feature scores;
   providing, by the device, feature data identifying the recommended features for display via an interface,
      wherein the feature data identifying the recommended features includes particular feature data identifying the recommended features of the one or more features that are to be selected by a user;
   receiving, by the device, the particular feature data identifying one or more selected features that are related to the one or more priorities,
   identifying, by the device, a set of technology services to include in a reference architecture that is to be used to select at least one cloud service provider to support the software application,
      wherein the set of technology services are identified based on a machine learning-driven analysis of the one or more priorities and the one or more selected features;
   including, by the device, data that identifies the set of technology services as part of the reference architecture;
   providing, by the device, data identifying the reference architecture for display via the interface;
   receiving, by the device, data identifying one or more selected technology services of the set of technology services, wherein the data identifying the one or more selected technology services serves as an indicator that the one or more selected technology services have been selected by the user;

updating, by the device, a set of scores associated with the reference architecture based on the one or more selected technology services, wherein a subset of the set of scores are updated to reflect one or more degrees to which one or more cloud service providers offer the one or more selected technology services; and providing, by the device, data identifying the set of scores that have been updated for display via the interface to allow the set of scores to be used to select a particular cloud service provider.

2. The method of claim 1, further comprising:
providing, after including the data that identifies the set of technology services as part of the reference architecture, configuration instructions to a smart device to cause the smart device and a set of attachable components of the smart device to be configured with the data identifying the set of technology services; and wherein receiving the data identifying the one or more selected technology services comprises:
receiving, from the smart device and based on one or more attachable components, of the set of attachable components, being attached to the smart device, at least one of:
the data identifying the one or more selected technology services, or
one or more identifiers indicating which of the one or more of the attachable components were attached to the smart device.

3. The method of claim 1, further comprising:
providing, after including the data that identifies the set of technology services as part of the reference architecture, configuration instructions to a particular device supporting virtual reality (VR) or augmented reality (AR) to cause the particular device to display the data identifying the set of technology services; and wherein receiving the data identifying the one or more selected technology services comprises:
receiving the data identifying the one or more selected technology services from the particular device,
wherein the data identifying the one or more selected technology services serves as a particular indicator that the user has interacted with a virtual environment to select the one or more selected technology services.

4. The method of claim 1, wherein the set of technology services include at least one of:
a database management service,
an enterprise integration service,
a user interface service,
a machine learning service,
a monitoring service,
an analytics service,
or a security service.

5. The method of claim 1, further comprising:
determining that a subset of the set of feature scores satisfy a threshold confidence level;
wherein identifying the recommended features associated with the set of feature scores comprises:
identifying the recommended features associated with the subset of the set of feature scores based on determining that the subset of the set of feature scores satisfy the threshold confidence level.

6. The method of claim 1, wherein updating the set of scores comprises:
providing data identifying the one or more selected technology services as input to a second data model to cause the second data model to output a set of service availability scores that reflect the one or more degrees to which the one or more cloud service providers offer the one or more selected technology services,
wherein the set of service availability scores are the subset of the set of scores.

7. The method of claim 1, wherein the subset of the set of scores is a first subset; and wherein the set of scores include at least one of:
a second subset of the set of scores that indicate degrees to which the one or more selected technology services account for the one or more selected features, or
a third subset of the set of scores indicating one or more degrees to which the one or more selected technology services have satisfied a set of architecture requirements.

8. A device, comprising:
one or more memories; and
one or more processors, operatively coupled to the one or more memories, to:
receive, from a user device, priority data identifying one or more priorities that are relevant to a configuration of one or more applications;
provide the priority data as input to a data model to cause the data model to output a set of feature scores identifying a likelihood of one or more features being related to the one or more priorities;
identify recommended features, of the one or more features, based on the set of feature scores;
provide feature data identifying the recommended features for display via an interface,
wherein the feature data identifying the recommended features includes particular feature data identifying the recommended features, of the one or more features, that are to be selected;
receive the particular feature data identifying one or more selected features that are related to the one or more priorities;
identify a set of technology services to include in a reference architecture that is to be used to select at least one cloud service provider to support the one or more applications,
wherein the set of technology services are identified based on the one or more priorities and the one or more selected features;
include data that identifies the set of technology services as part of the reference architecture;
provide data identifying the reference architecture to be displayed via the interface of the user device;
receive data identifying one or more selected technology services, of the set of technology services;
update a set of scores associated with the reference architecture based on a result of a machine learning-driven analysis of the one or more priorities, the one or more selected features, and the one or more selected technology services,
wherein the set of scores include at least one of:
a first subset of the set of scores indicating one or more degrees to which one or more cloud service providers offer the one or more selected technology services, a second subset of the set of scores indicating one or more degrees to which the one or more selected technology services relate to the one or more selected features, or a third subset of the set of scores indicating one or more degrees to which the one or more selected technology services have satisfied a set of architecture requirements; and provide data identifying the set of scores that have been updated to be displayed via the interface of the user device.

9. The device of claim 8, wherein the one or more processors are further to:

provide, after including the data that identifies the set of technology services as part of the reference architecture, configuration instructions to another device to allow the other device to use the configuration instructions to provide an interactive display of the set of technology services; and wherein the one or more processors, when receiving the data identifying the one or more selected technology services, are to:

receive the data identifying the one or more selected technology services from the other device.

10. The device of claim 8, wherein the one or more priorities include at least one of:
one or more priorities directed to a particular industry,
one or more priorities directed to one or more organizational processes, or
one or more priorities directed to one or more organizational concepts; and wherein the one or more features include at least one of:
one or more features that identify tasks of the one or more organizational processes, or
one or more features that identify properties of the one or more organizational concepts.

11. The device of claim 8, wherein the priority data identifying the one or more priorities is particular priority data; and wherein the one or more processors are further to:

receive, from the user device, data describing a problem to be addressed by the one or more applications;

analyze the data describing the problem using one or more natural language processing techniques to determine a problem type;

identify recommended priorities by referencing a data structure that associates the recommended priorities with an identifier of the problem type; and provide priority data identifying the recommended priorities for display via the interface,
wherein the priority data identifying the recommended priorities includes the particular priority data identifying the one or more priorities.

12. The device of claim 8, wherein the one or more processors are further configured to:

analyze the priority data using one or more natural language processing techniques to determine a feature type;

identify the recommended features by referencing a data structure that associates the recommended features with an identifier of the feature type; and provide priority data identifying the recommended features for display via the interface of the user device,
wherein the priority data identifying the recommended features includes the feature data identifying the recommended features.

13. The device of claim 8, wherein the one or more processors, to identify the set of technology services, are to:

provide the priority data and the particular feature data as input to a second data model to cause the second data model to output a set of relevancy scores indicating one or more degrees to which particular technology services included in a list of technology services are relevant to the one or more priorities or the one or more selected features,
wherein the set of technology services is included in the list of technology services, determine that a subset of the set of relevancy scores, which are associated with the set of technology services, satisfy a threshold confidence level, and identify the set of technology services based on the subset of the set of relevancy scores satisfying the threshold confidence level.

14. The device of claim 8, wherein the one or more processors, to update the set of scores, are to:

provide data identifying the one or more selected technology services as input to a second data model to cause the second data model to output a set of service availability scores that reflect the degree to which the one or more cloud service providers offer the one or more selected technology services, wherein the set of service availability scores are the first subset of the set of scores.

15. A non-transitory computer-readable medium storing instructions, the instructions comprising:

one or more instructions that, when executed by one or more processors of a device, cause the one or more processors to:

receive, from a user device, priority data identifying one or more priorities that are relevant to a configuration of an application;

provide the priority data as input to a data model to cause the data model to output a set of feature scores identifying a likelihood of one or more features being related to the one or more priorities;

identify recommended features, of the one or more features, based on the set of feature scores;

provide feature data identifying the recommended features for display via an interface,
wherein the feature data identifying the recommended features includes particular feature data identifying the recommended features, of the one or more features, that are to be selected;

receive the particular feature data identifying one or more selected features that are related to the one or more priorities;

identify a set of technology services to include in a reference architecture that is to be used to select at least one cloud service provider to support the application,
wherein the set of technology services are identified based on the one or more priorities and the one or more selected features;

include data that identifies the set of technology services as part of the reference architecture;

provide data identifying the reference architecture to be displayed via the interface of the user device;

provide configuration instructions to another device to allow the other device to use the configuration instructions to provide an interactive display of the set of technology services in a manner that is accessible by a user;

receive, from the other device, data identifying one or more selected technology services, of the set of technology services, that have been selected via the interactive display of the set of technology services;

update a set of scores associated with the reference architecture based on the one or more selected technology services,
  wherein a subset of the set of scores are updated to reflect one or more degrees to which one or more cloud service providers offer the one or more selected technology services; and
provide data identifying the set of scores that have been updated to be displayed via the interface of the user device to allow the set of scores to be used to select a particular cloud service provider.

16. The non-transitory computer-readable medium of claim 15, wherein the other device is a smart device that includes a set of attachable components used to provide the interactive display or a particular device supporting virtual reality (VR) or augmented reality (AR) that uses a virtual environment to provide the interactive display.

17. The non-transitory computer-readable medium of claim 15, wherein the set of technology services include at least one of:
  a database management service,
  an enterprise integration service,
  a user interface service,
  a machine learning service,
  a monitoring service,
  an analytics service, or
  a security service.

18. The non-transitory computer-readable medium of claim 15, wherein the one or more instructions, that cause the one or more processors to identify the set of technology services, cause the one or more processors to:
  provide the priority data and the particular feature data as input to a second data model to cause the second data model to output a set of relevancy scores indicating one or more degrees to which particular technology services included in a list of technology services are relevant to the one or more priorities and the one or more selected features,
  wherein the set of technology services is included in the list of technology services,
  determine that a subset of the set of relevancy scores, which are associated with the set of technology services, satisfy a threshold confidence level, and
  identify the set of technology services based on the subset of the set of relevancy scores satisfying the threshold confidence level.

19. The non-transitory computer-readable medium of claim 15, wherein the one or more instructions, that cause the one or more processors to update the set of scores, cause the one or more processors to:
  provide data identifying the one or more selected technology services as input to a second data model to cause the second data model to output a set of service availability scores that reflect the degree to which the one or more cloud service providers offer the one or more selected technology services,
  wherein the set of service availability scores are the subset of the set of scores.

20. The non-transitory computer-readable medium of claim 15, wherein the subset of the set of scores is a first subset; and wherein the set of scores include at least one of:
  a second subset of the set of scores that indicate one or more degrees to which the one or more selected technology services relate to the one or more selected features, or
  a third subset of the set of scores indicating one or more degrees to which the one or more selected technology services have satisfied a set of architecture requirements.

* * * * *